(12) United States Patent
Kano et al.

(10) Patent No.: US 9,417,081 B2
(45) Date of Patent: Aug. 16, 2016

(54) DEVICE FOR PREDICTING ENERGY CONSUMPTION AND METHOD FOR PREDICTING ENERGY CONSUMPTION

(71) Applicant: NISSAN MOTOR CO., LTD., Yokohama-shi, Kanagawa (JP)

(72) Inventors: Junichi Kano, Atsugi (JP); Yuzo Nakano, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/782,739

(22) PCT Filed: Mar. 28, 2014

(86) PCT No.: PCT/JP2014/059112
§ 371 (c)(1),
(2) Date: Oct. 6, 2015

(87) PCT Pub. No.: WO2014/168023
PCT Pub. Date: Oct. 16, 2014

(65) Prior Publication Data
US 2016/0040995 A1    Feb. 11, 2016

(30) Foreign Application Priority Data

Apr. 11, 2013   (JP) ................................. 2013-082823

(51) Int. Cl.
*G06F 19/00* (2011.01)
*G01C 21/34* (2006.01)
(Continued)

(52) U.S. Cl.
CPC .............. *G01C 21/3469* (2013.01); *G01L 7/00* (2013.01); *G07C 5/02* (2013.01); *F02D 2200/0625* (2013.01); *F02D 2200/501* (2013.01); *F02D 2200/701* (2013.01); *F02D 2200/702* (2013.01)

(58) Field of Classification Search
USPC ........................................................ 701/123
See application file for complete search history.

(56) References Cited

U.S. PATENT DOCUMENTS

| 8,453,677 | B2 | 6/2013 | Howes et al. |
| 9,014,959 | B2 | 4/2015 | Kanno et al. |
| 2010/0121514 | A1* | 5/2010 | Kato ........................ B60K 6/48 701/22 |

(Continued)

FOREIGN PATENT DOCUMENTS

| JP | 2002-188932 A | 7/2002 |
| JP | 2011-506873 A | 3/2011 |

(Continued)

*Primary Examiner* — Hussein A. Elchanti
(74) *Attorney, Agent, or Firm* — Foley & Lardner LLP

(57) ABSTRACT

A device for predicting energy consumption includes an obtaining unit (110), an air resistance calculating unit (140, 150), and an energy consumption predicting unit (150). The obtaining unit (110) is configured to obtain road information including traveling speed information set for each route. The air resistance calculating unit (140, 150) is configured to calculate air resistance as a calculated air resistance value by an air resistance calculation formula on the basis of the traveling speed information of the scheduled traveling route and to correct the calculated air resistance value so that the air resistance is higher according as the traveling speed along the scheduled traveling route is lower. The air resistance is caused when a vehicle travels along a scheduled traveling route. The energy consumption predicting unit (150) is configured to predict an energy consumption of the scheduled traveling route on the basis of the corrected air resistance value.

11 Claims, 26 Drawing Sheets

(51) Int. Cl.
*G01L 7/00* (2006.01)
*G07C 5/02* (2006.01)

(56) References Cited

U.S. PATENT DOCUMENTS

| | | | |
|---|---|---|---|
| 2011/0264317 A1* | 10/2011 | Druenert | B60K 6/48 |
| | | | 701/22 |
| 2011/0313647 A1* | 12/2011 | Koebler | B60L 15/2045 |
| | | | 701/123 |
| 2012/0029803 A1 | 2/2012 | Yasushi et al. | |
| 2012/0066232 A1 | 3/2012 | Engelhardt et al. | |
| 2013/0261966 A1* | 10/2013 | Wang | G01C 21/3469 |
| | | | 701/533 |
| 2014/0180511 A1* | 6/2014 | Daum | B60W 20/00 |
| | | | 701/22 |
| 2015/0177009 A1* | 6/2015 | Saito | B60L 3/00 |
| | | | 701/424 |
| 2016/0040995 A1* | 2/2016 | Kano | G01C 21/3469 |
| | | | 701/123 |

FOREIGN PATENT DOCUMENTS

| | | |
|---|---|---|
| JP | 2012-58229 A | 3/2012 |
| JP | 2012-96788 A | 5/2012 |
| JP | 2012-101762 A | 5/2012 |
| JP | 2012-255757 A | 12/2012 |
| JP | 5312574 B2 | 10/2013 |
| WO | WO 2010-113246 A1 | 10/2010 |
| WO | WO 2012/114499 A1 | 8/2012 |

* cited by examiner

Fig.4
(A)
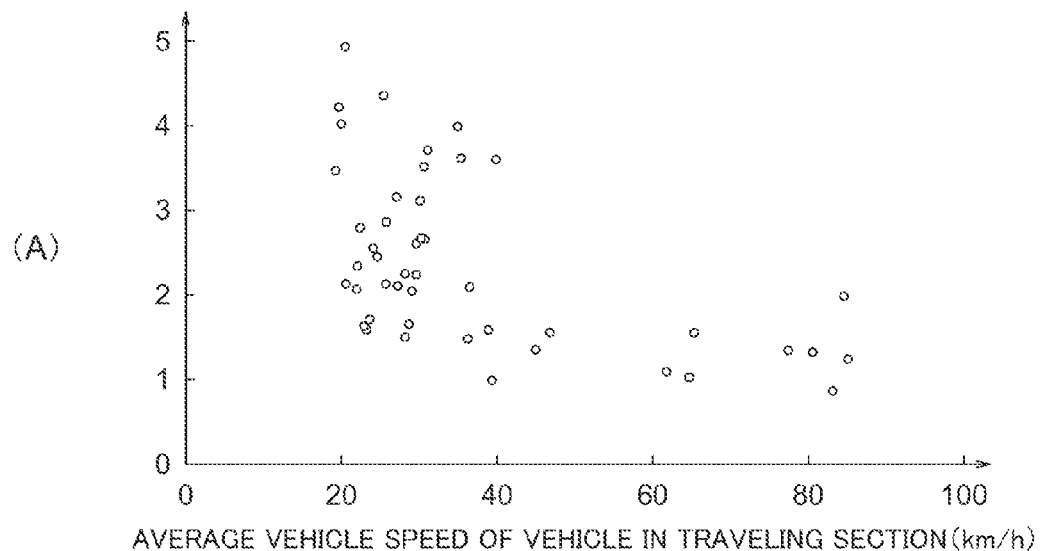
(B)
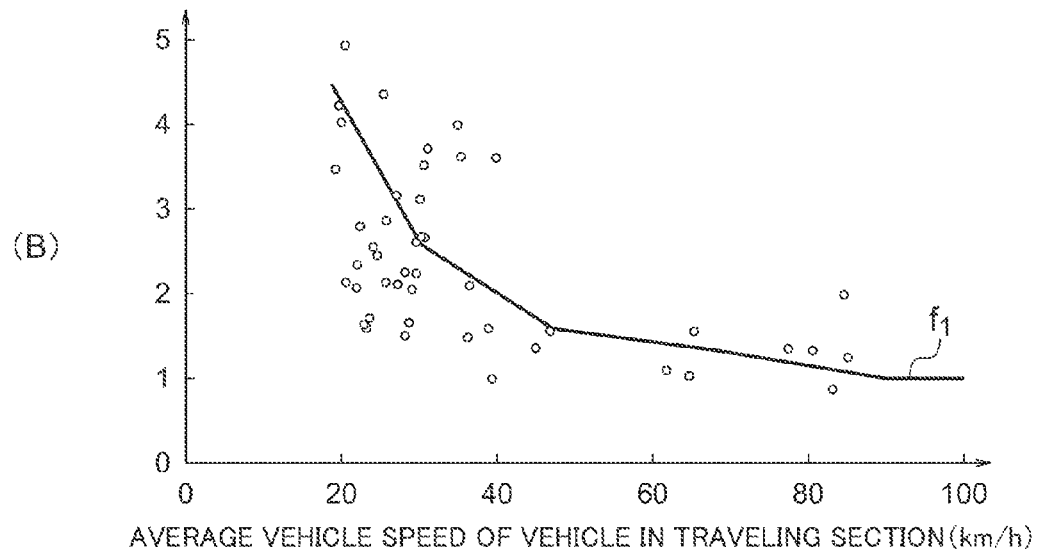

DEVICE FOR PREDICTING ENERGY CONSUMPTION AND METHOD FOR PREDICTING ENERGY CONSUMPTION

TECHNICAL FIELD

The present invention relates to a device for predicting energy consumption and a method for predicting energy consumption.

This application claims a priority on the basis of Japanese Patent Application No. 2013-082823, filed on Apr. 11, 2013. The contents of the above application is incorporated herein by reference in the designated countries in which the incorporation by reference is accepted.

BACKGROUND ART

As a prior art, a device for predicting fuel consumption on the basis of a vehicle speed, an acceleration, and air resistance caused when the vehicle actually travels is known (see Patent Document 1).

PRIOR ART DOCUMENT

Patent Document

[Patent Document 1] JP 2011-506873 A

SUMMARY OF INVENTION

Problems to be Solved by Invention

In the prior art, energy consumption at the current time point is predicted on the basis of such as the vehicle speed and the acceleration obtained when the vehicle actually travels. It is, however, impossible to predict the energy consumption over a scheduled traveling route before the vehicle travels.

A problem to be solved by the present invention is to provide a device for predicting energy consumption which can appropriately predict energy consumption.

Means for Solving Problems

The invention solves the problem as below. Air resistance caused when a vehicle travels along a scheduled traveling route is calculated by using an air resistance calculation formula on the basis of a traveling speed information set for each route. The calculated air resistance is corrected so that the air resistance is higher according as the traveling speed along the scheduled traveling route is slower. The energy consumption over the scheduled traveling route is predicted on the basis of the corrected air resistance.

Effect of Invention

According to the present invention, the air resistance caused when the vehicle travels along the scheduled traveling route is calculated on the basis of the traveling speed information set for each route. Accordingly, it is possible to predict the energy consumption over the scheduled traveling route. In particular, according to the present invention, the air resistance calculated by the air resistance calculation formula is corrected in consideration of the tendency that the frequency of acceleration is higher according as the traveling speed along the scheduled traveling route is lower. Accordingly, it is possible to highly precisely predict the air resistance caused when the vehicle travels along the traveling route. As a result, it is possible to appropriately predict the energy consumption over the scheduled traveling route on the basis of the corrected air resistance.

BRIEF DESCRIPTION OF DRAWINGS

FIG. 4(A) is a diagram illustrating an example of an experiment values of air resistance coefficients;

FIG. 4(B) is a diagram illustrating an example of an air resistance calculating function;

MODE(S) FOR CARRYING OUT THE INVENTION

Hereinafter, embodiments of the present invention will be described with reference to the drawings. Further, the embodiments of the present invention will be described below by exemplifying a navigation device mounted on an electric vehicle.

First Embodiment

Figure 1:
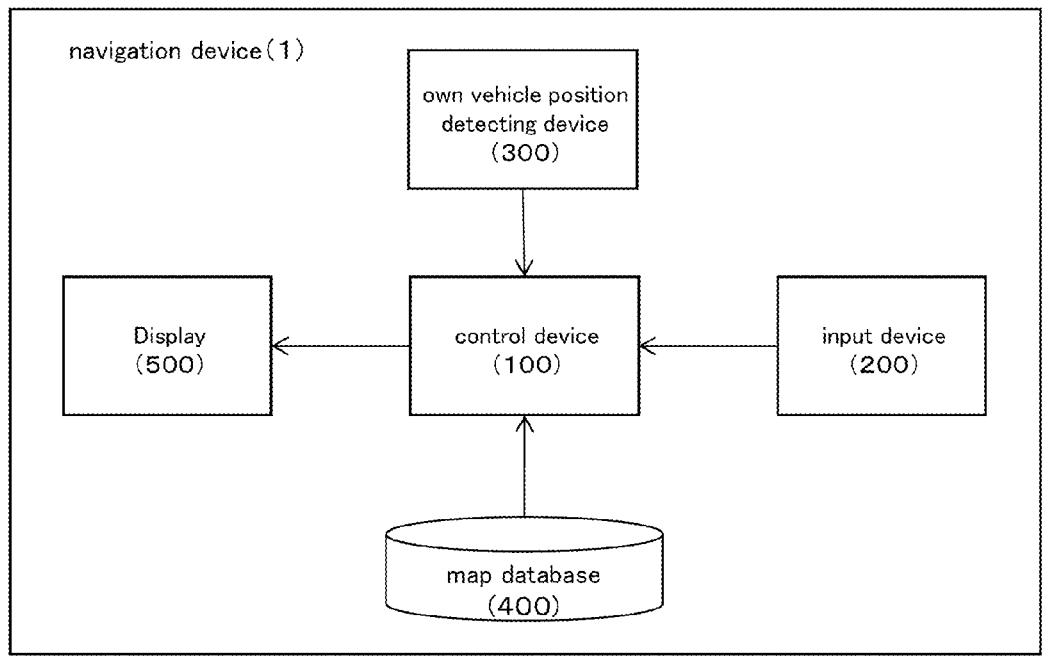
FIG. 1 is a configuration diagram of a navigation device according to an embodiment of the present invention.

FIG. 1 is a configuration diagram of a navigation device 1 according to a present embodiment. The navigation device 1 predicts energy consumption from a current position to a destination. The navigation device 1 determines whether a vehicle can reach a destination from the current position by a remaining amount of current battery on the basis of the predicted energy consumption. The navigation device 1 includes an input device 200 configured to input a destination, an own vehicle position detecting device 300 configured to detect a current position of an own vehicle, a map database 400 configured to store map information including road information, a control device 100 configured to predict energy consumption to a destination, and a display 500 configured to suggest a prediction result to a passenger. Hereinafter, the configurations will be described in detail.

The input device 200 is, for example, a device such as a touch panel disposed on a display screen used to input a user's instruction by user's hand or a microphone used to input a user's voice. The information which is input by the input device 200 is transmitted to the control device 100.

The own vehicle position detecting device 300 includes a GPS (Global Positioning System) unit, a gyro sensor, and a vehicle speed sensor. The own vehicle position detecting device 300 detects radio waves transmitted from telecommunication satellites and periodically obtain the position information of the own vehicle. Further, the own vehicle position detecting device 300 detects the current position of the own vehicle on the basis of the position information of the own vehicle, the angle change information obtained from the gyro sensor, and the vehicle speed obtained from the vehicle speed sensor. The position information of the own vehicle detected by the own vehicle position detecting device 300 is transmitted to the control device 100.

The map database 400 stores the map information including the road information. Specifically, the map database 400 stores the road information including a traveling distance, an altitude, an inclination, and an average vehicle speed in each traveling section such as a road link. The average vehicle speed in the traveling section is an average value of vehicle speed information collected from vehicles actually traveling in the traveling section. The map information stored in the map database 400 is used for the control device 100 to predict the energy consumption from the current position to the destination.

The display 500 displays the information transmitted from the control device 100 on a screen of the display 500. The information which is displayed by the display 500 includes a map around the own vehicle and the recommended route from the current position to the destination. In addition, the information includes energy consumption from the current position to the destination, information used to determine whether the battery charging is necessary, and positions of battery charging stations.

The control device 100 includes a ROM (Read Only Memory) configured to store a program for predicting the energy consumption from the current position to the destination, a CPU (Central Processing Unit) configured as an operation circuit for executing a program stored in the ROM, and a RAM (Random Access Memory) configured as an accessible storage device. Further, an MPU (Micro Processing Unit), a DSP (Digital Signal Processor), an ASIC (Application Specific Integrated Circuit), an FPGA (Field Programmable Gate Array), or the like can be used as the operation circuit instead of or together with the CPU.

Figure 2:
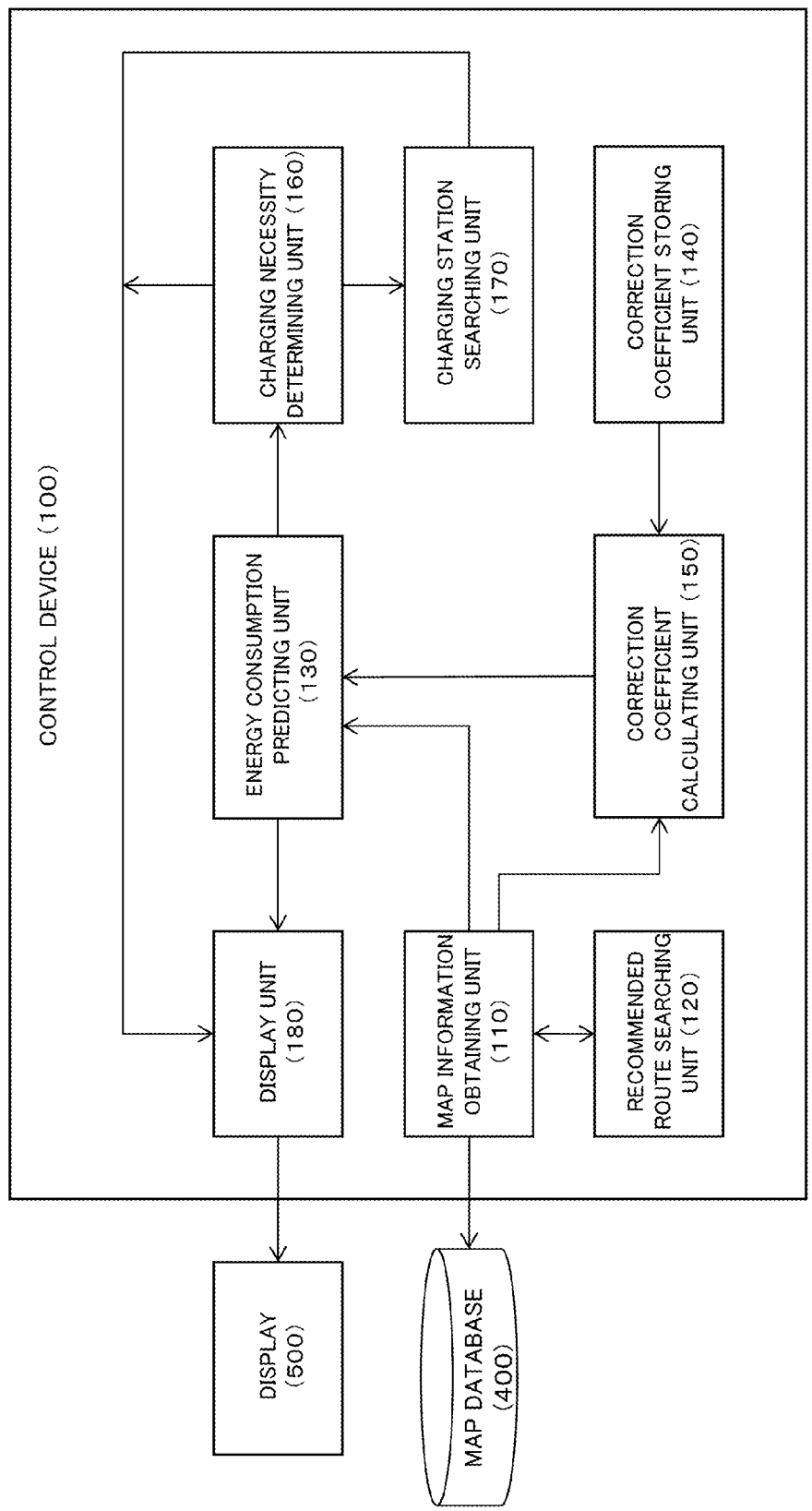
FIG. 2 is a functional block diagram of a control device according to a first embodiment.

FIG. 2 is a functional block diagram illustrating a function of the control device 100 according to the first embodiment of the present invention. In the first embodiment, as illustrated in FIG. 2, the control device 100 includes a map information obtaining unit 110, a recommended route searching unit 120, an energy consumption predicting unit 130, a correction coefficient storing unit 140, a correction coefficient calculating unit 150, a charging necessity determining unit 160, a charging station searching unit 170, and a display unit 180.

The map information obtaining unit 110 obtains the map information including the road information from the map database 400. The map information obtained by the map information obtaining unit 110 is transmitted to the recommended route searching unit 120, the energy consumption predicting unit 130, and the correction coefficient calculating unit 150.

The recommended route searching unit 120 searches for the recommended route from the current position to the destination on the basis of the map information obtained from the map information obtaining unit 110, the destination input through the input device 200, and the position information of the own vehicle detected by the own vehicle position detecting device 300.

The energy consumption predicting unit 130 predicts the energy consumption from the current position to the destination. Specifically, the energy consumption predicting unit 130 predicts rolling resistance, inclination resistance, air resistance, and loss in a drive-train such as a motor and a gear in a recommended route. The energy consumption predicting unit 130 predicts the energy consumption from the current position to the destination by summing up these values.

Air resistance Fa caused when the vehicle travels can be calculated on the basis of the following formula (1). In the following formula (1), $V_{cur}$ indicates a traveling vehicle speed and K indicates a parameter relating to air resistance which includes an air resistance coefficient and projected area of a vehicle.

[Formula 1]

$$\text{AIR RESISTANCE } Fa = kV_{cur}^2 \quad (1)$$

In this way, the air resistance Fa changes in response to the vehicle speed $V_{cur}$ obtained when the vehicle travels. Therefore, for example, when the recommended route is divided into a plurality of traveling sections, an integrated value of the air resistance in each traveling section can be calculated on the basis of the average speed $V_{ave}$ of the traveling section and the traveling distance of the traveling section as the following formula (2). Then, the integrated values of air resistance in the traveling sections are summarized as the integrated value of air resistance to the destination in the recommended route.

[Formula 2]

$$\text{INTEGRATED VALUE OF AIR RESISTANCE IN TRAVELING SECTION} = kV_{ave}^2 * d \quad (2)$$

However, the integrated value of air resistance calculated by the formula (2) is air resistance caused when the vehicle travels at a constant average speed $V_{ave}$. Since the vehicle actually travels while being accelerated and decelerated, an error may be caused between the integrated value of air resistance calculated by the formula (2) and the integrated value of actual air resistance. That is, the air resistance caused when the vehicle travels at a constant speed is proportional to the square of the speed as illustrated in the formula (2), but the air resistance caused when the vehicle is accelerated is proportional to the cube of the speed. For that reason, the integrated value of air resistance in the traveling section increases according as the vehicle is accelerated in the traveling section. Accordingly, an error is caused between the integrated value of air resistance calculated by the formula (2) and the integrated value of actual air resistance.

Therefore, when the energy consumption predicting unit 130 predicts the integrated value of air resistance in each traveling section, the integrated value of air resistance calculated on the basis of the formula (2) is corrected in consideration of the influence of the acceleration in each traveling section. Specifically, the energy consumption predicting unit 130 corrects the air resistance by using the air resistance correction coefficient calculated by the correction coefficient calculating unit 150 to be described later. Further, a method for correcting the integrated value of air resistance in the traveling section will be described later.

Further, the energy consumption predicting unit 130 according to the embodiment predicts the energy consumption to the destination on the basis of an integrated value of loss caused in a drive-train such as a motor or a gear. Here, when the vehicle travels at a constant speed in a predetermined traveling section, the loss L in the drive-train in the traveling section is caused by travel resistance such as rolling resistance and air resistance. The loss L in the drive-train in the traveling section can be calculated on the basis of, for example, the following formula (3).

[Formula 3]

$$\text{LOSS } L = \frac{(\text{ROLLING RESISTANCE} + \text{AIR RESISTANCE})}{\text{MOTOR EFFICIENCY} * \text{GEAR EFFICIENCY}} - (\text{ROLLING RESISTANCE} + \text{AIR RESISTANCE}) \quad (3)$$

However, the integrated value of loss in the drive-train calculated by the formula (3) is obtained when the vehicle travels at a constant speed. Since the vehicle actually travels while being accelerated and decelerated, an error may be caused between the integrated value of loss in the drive-train calculated by the formula (3) and the integrated value of actual loss in the drive-train. That is, when the vehicle is accelerated, the loss in the drive-train caused by an inertia moment is added to the loss L in the drive-train other than the loss in the drive-train caused by the travel resistance. For that reason, an error may be caused between the loss in the drive-train obtained by the formula (3) and the actual loss in the drive-train. When the energy consumption predicting unit 130 predicts the integrated value of loss in the drive-train in the traveling section, the loss in the drive-train calculated by the formula (3) is corrected in consideration of an influence of the acceleration in the traveling section. Specifically, the energy consumption predicting unit 130 corrects the loss in the drive-train calculated by the formula (3) by using the loss correction coefficient calculated by the correction coefficient calculating unit 150 to be described later.

The correction coefficient storing unit 140 stores the air resistance correction coefficient for correcting the air resistance in the recommended route and the loss correction coefficient for correcting the loss in the drive-train in the recommended route. Hereinafter, the air resistance correction coefficient and the loss correction coefficient will be described.

Figure 3:
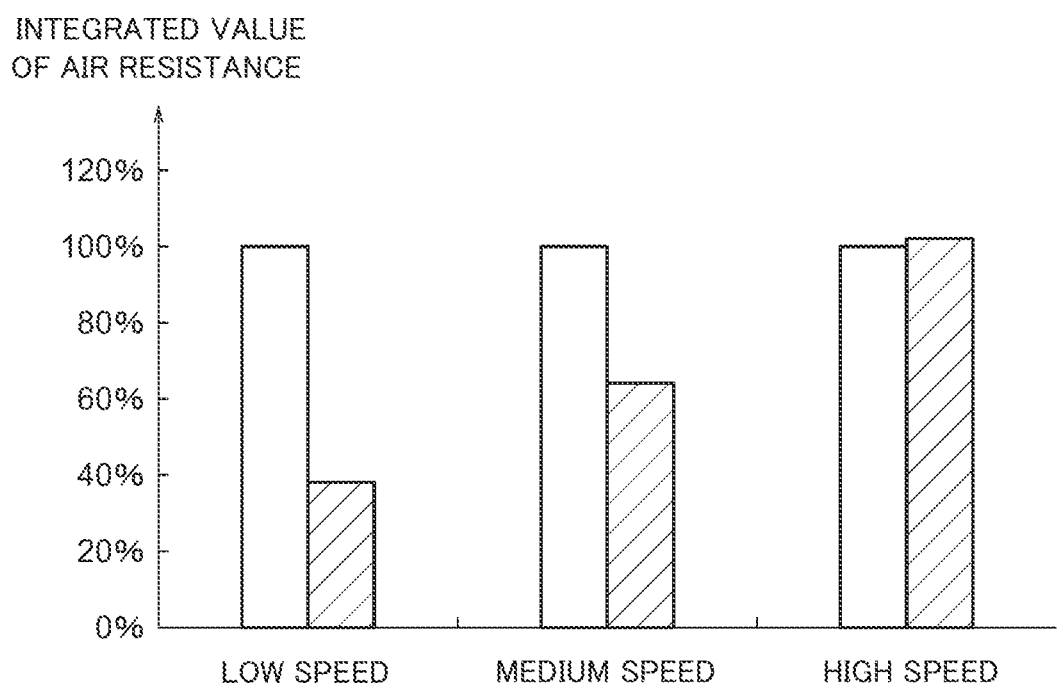
FIG. 3 is a graph illustrating an example of an integrated value of actual air resistance in a predetermined traveling section and an integrated value of air resistance predicted on the basis of the following formula (2)

FIG. 3 is a graph illustrating an example of the integrated value of actual air resistance in a predetermined traveling section and the integrated value of air resistance calculated by the formula (2). Further, in FIG. 3, the integrated value of actual air resistance is indicated by white bar graph, and the integrated value of air resistance calculated by the formula (2) is indicated by diagonal hatching bar graph. In FIG. 3, the integrated value of air resistance calculated by the formula (2) is indicated by the percentage (%) when the integrated value of actual air resistance is set as 100%. Further, the integrated value of actual air resistance in FIG. 3 is an integrated value of air resistance obtained by an experiment from the profile of the travel speed when the vehicle actually travels in the traveling section.

In the examples illustrated in FIG. 3, when the vehicle speed is low, the integrated value of air resistance calculated by the formula (2) is approximately 40% of the integrated value of actual air resistance. It show that a large error is caused with respect to the actual air resistance. Further, even when the vehicle travels at a medium speed, the integrated value of air resistance calculated by the formula (2) is approximately 60% of the integrated value of actual air resistance. It shows that an error is caused with respect to the actual air resistance. Further, when the vehicle travels at a high speed, the integrated value of air resistance calculated by the formula (2) is approximately 100% of the integrated value of actual air resistance, close to the integrated value of actual air resistance. In this way, there is a tendency that an error between the integrated value of actual air resistance and the integrated value of air resistance calculated by the formula (2) is larger according as the vehicle speed in the traveling section is lower.

In the embodiment, the air resistance correction coefficient for correcting the error of the air resistance by the acceleration is stored in advance in the correction coefficient storing unit 140. Hereinafter, the air resistance correction coefficient stored in the correction coefficient storing unit 140 will be described in detail.

The air resistance correction coefficient stored in the correction coefficient storing unit 140 is set in advance, on the basis of the integrated value of actual air resistance obtained in advance by an experiment and the integrated value of air resistance calculated in advance by the formula (2). For example, the ratio between the integrated value of air resistance calculated on the basis of the formula (2) and the integrated value of actual air resistance obtained by an experiment is calculated in advance as an experiment value of air resistance coefficients each average vehicle speed $V_{ave}$ in the traveling section. The ratio the integrated value of actual air resistance/the integrated value of air resistance calculated on the basis of the formula (2)' is indicated as a calculated experiment values. Then, the calculated experiment values of air resistance coefficients is plotted each average vehicle speed $V_{ave}$ in the traveling section as illustrated in FIG. 4(A). Further, FIG. 4(A) is a diagram illustrating an example of the experiment values of air resistance coefficients.

In the embodiment, for example, as illustrated in FIG. 4(B), a regression line of the plotted experiment values of air resistance coefficients is calculated. Then, the calculated regression line is stored in advance as a function $f_1$ (hereinafter, referred to as an air resistance calculating function $f_1$) in the correction coefficient storing unit 140. The function $f_1$ is used for calculating the air resistance correction coefficient. In this way, in the embodiment, the air resistance correction coefficient for each average vehicle speed $V_{ave}$ in the traveling section is stored as the air resistance calculating function $f_1$ in the correction coefficient storing unit 140. Further, FIG. 4(B) is a diagram illustrating an example of the air resistance calculating function $f_1$.

Figure 5:
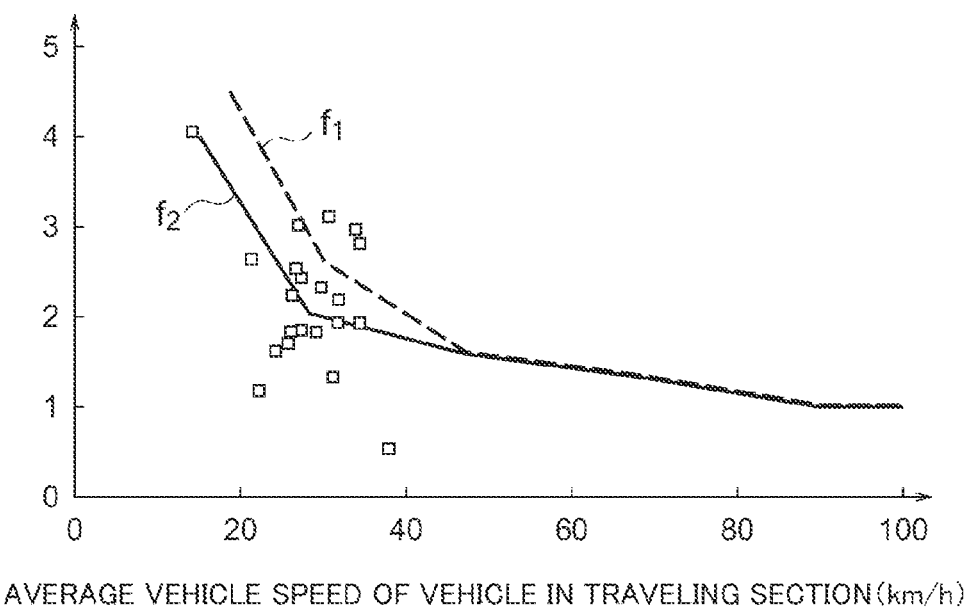
FIG. 5 is a diagram illustrating an example of an air resistance correction function when a traveling section is inclined.

Further, there is a tendency that frequency of acceleration in the traveling section decreases when the traveling section is inclined compared to a case in which the traveling section is flat. Therefore, in the embodiment, as illustrated in FIG. 5, an air resistance calculating function $f_2$ used when the traveling section is inclined is stored in advance in the correction coefficient storing unit 140 separately from the air resistance calculating function $f_1$ used when the traveling section is not inclined. Further, FIG. 5 is a diagram illustrating an example of the air resistance calculating function $f_2$ used when the traveling section is inclined. In FIG. 5, the experiment values of air resistance coefficients obtained by an experiment in the inclined traveling section is indicated by a white square plot. Further, for convenience of description, the air resistance calculating function $f_1$ used when the traveling section is not inclined is also illustrated by a dashed line in FIG. 5.

As illustrated in FIG. 5, when the average speed $V_{ave}$ in the traveling section is low (for example, a speed lower than 40 km/h), the value of the air resistance correction coefficient calculated by the air resistance calculating function $f_2$ used when the traveling section is inclined is smaller than that of the air resistance correction coefficient calculated by the air resistance calculating function $f_1$ used when the traveling section is not inclined. In this way, the air resistance correction coefficient calculated by the air resistance calculating function $f_2$ is stored as a value smaller than the air resistance correction coefficient calculated by the air resistance calculating function $f_1$. Accordingly, even when the traveling section is inclined and the frequency of acceleration in the traveling section is low, it is possible to appropriately correct the integrated value of air resistance in the traveling section.

Further, the air resistance calculating function $f_2$ used when the traveling section is inclined is set so that the air resistance correction coefficient is calculated in response to an inclination degree of the traveling section. That is, the air resistance calculating function $f_2$ illustrated in FIG. 5 exemplarily shows the air resistance calculating function $f_2$ at a predetermined inclination degree. The air resistance calculating function $f_2$ stored in the correction coefficient storing unit 140 can calculate one air resistance correction coefficient in response to the average vehicle speed $V_{ave}$ and the inclination of the traveling section. Further, in the embodiment, the air resistance calculating function $f_2$ can be set so that the air resistance correction coefficient is smaller according as the inclination degree of the traveling section is larger.

Figure 6:
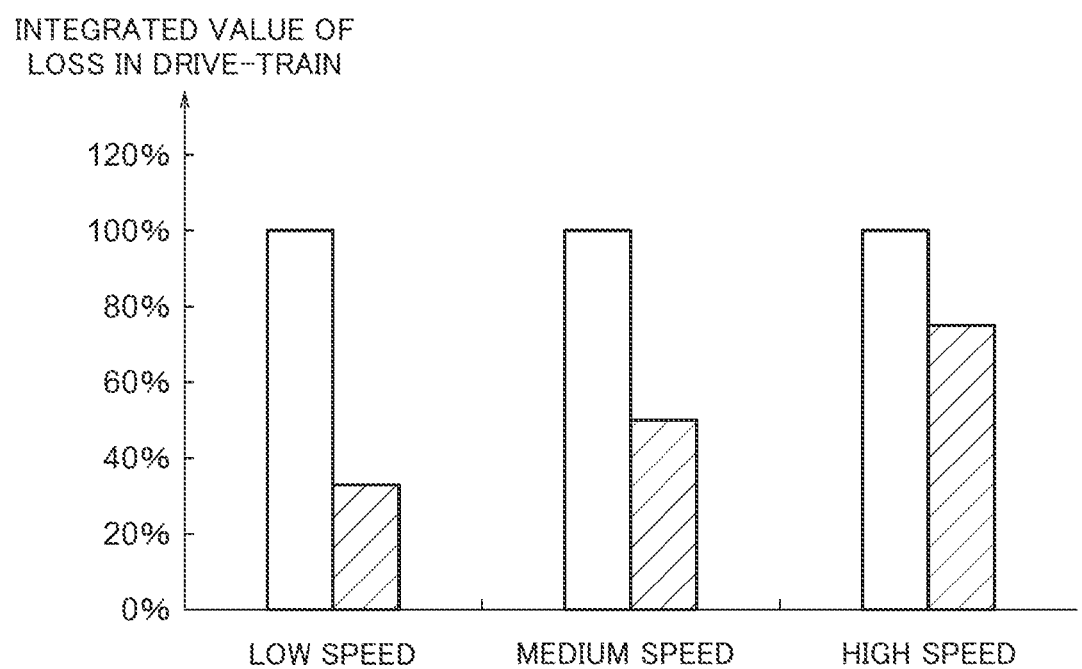
FIG. 6 is a graph illustrating an example of an integrated value of actual loss in a drive-train in a predetermined traveling section and an integrated value of loss in a drive-train predicted on the basis of the following formula (3)

Further, FIG. 6 is a graph illustrating an example of the integrated value of actual loss in the drive-train in a predetermined traveling section and the integrated value of loss in the drive-train calculated on the basis of the formula (3). Further, in FIG. 6, the integrated value of actual loss in the drive-train is indicated by white bar graph, and the integrated value of loss in the drive-train calculated on the basis of the formula (3) is indicated by diagonal hatching bar graph. Further, in FIG. 6, the integrated value of loss in the drive-train calculated on the basis of the formula (3) is indicated by the percentage (%) when the integrated value of actual loss in the drive-train is set as 100%. Further, the actual loss in the drive-train is loss in a drive train obtained by an experiment from the profile of the travel speed when the vehicle actually travels in the traveling section.

In the example illustrated in FIG. 6, when the vehicle speed is low, the integrated value of loss in the drive-train calculated by the formula (3) is approximately 30% of the integrated value of actual loss in the drive-train. It shows that a large error is caused with respect to the integrated value of actual loss. Further, even when the vehicle speed is medium or high, an error is caused between the integrated value of actual loss and the loss calculated by the formula (3) according as the vehicle speed is lower. In this way, there is a tendency that an error between the integrated value of actual loss in the drive-train and the integrated value of loss in the drive-train calculated by the formula (3) is larger according as the average vehicle speed $V_{ave}$ is lower.

In the embodiment, the loss correction coefficient for correcting the error of the loss in the drive-train such as the motor or the gear is stored in advance in the correction coefficient storing unit 140. Hereinafter, the loss correction coefficient stored in the correction coefficient storing unit 140 will be described in detail.

Figure 7:
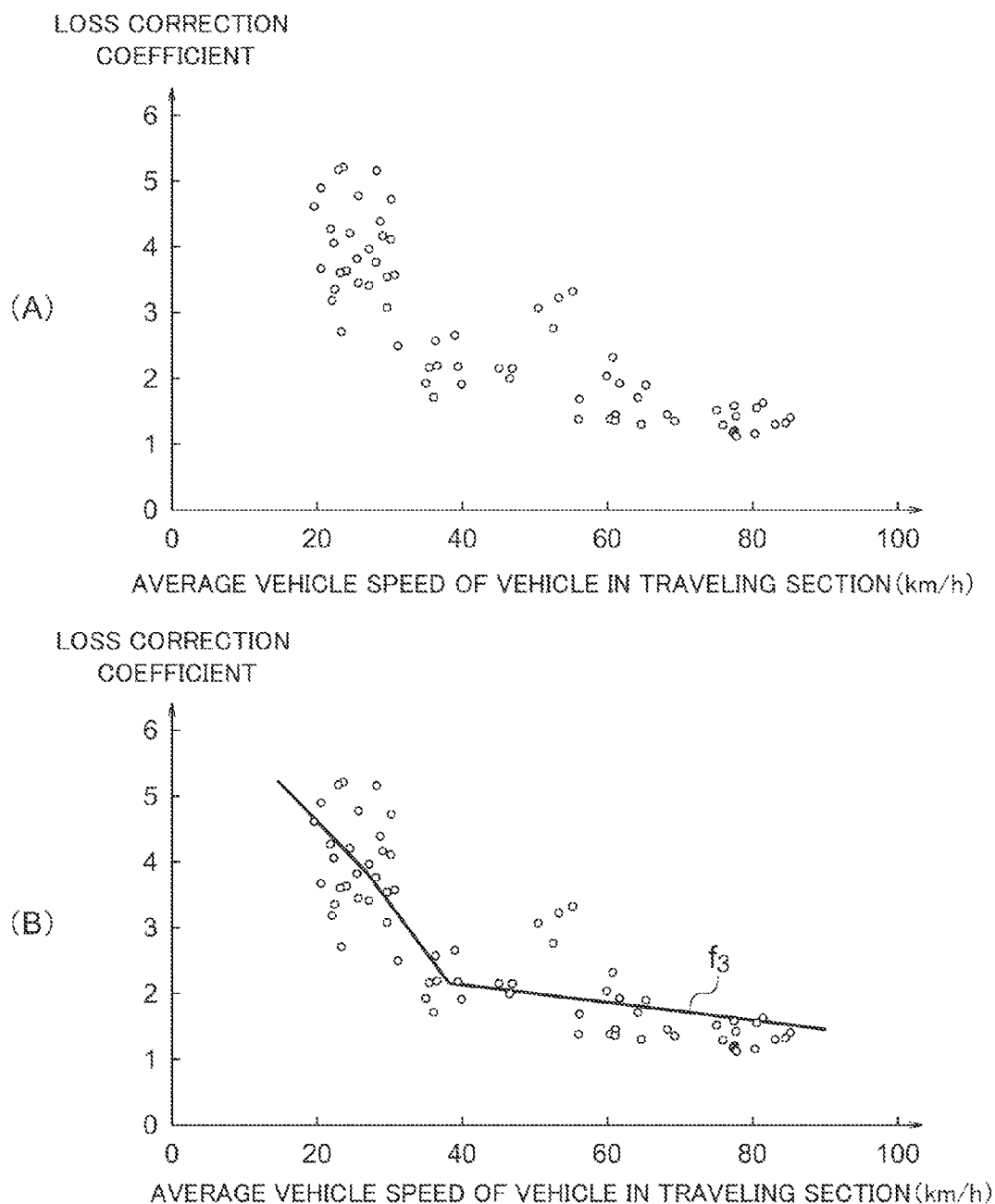
FIG. 7(A) is a diagram illustrating an example of an experiment values of loss coefficients.
FIG. 7(B) is a diagram illustrating an example of a loss calculating function.

The loss correction coefficient stored in the correction coefficient storing unit 140 is set in advance on the basis of the integrated value of loss caused by the travel resistance and the integrated value of loss caused by the inertia moment. Note that, the integrated value of loss caused by the travel resistance is calculated in advance on the basis of the formula (3). The integrated value of loss caused by the inertia moment is calculated in advance on the basis of speed information obtained when the vehicle actually travels in the traveling section. For example, the ratio between the integrated value of loss caused by the travel resistance and the integrated value of loss caused by the inertia moment is calculated in advance as an experiment value of loss coefficient each average vehicle speed $V_{ave}$ in the traveling section. The ratio is indicated as ({the integrated value of loss in the drive-train caused by the travel resistance+the integrated value of loss in the drive-train caused by the inertia moment}/the integrated value of loss in the drive-train caused by the travel resistance). Then, the calculated experiment value of loss coefficient is plotted each average vehicle speed $V_{ave}$ in the traveling section as illustrated in FIG. 7(A). FIG. 7(A) is a diagram illustrating an example of the experiment values of loss coefficients.

In the embodiment, for example, as illustrated in FIG. 7(B), the regression line of the plotted experiment values of loss coefficients is calculated. Then, the calculated regression line is stored in advance as a function $f_3$ (hereinafter, referred to as a loss calculating function $f_3$) in the correction coefficient storing unit 140. The function $f_3$ is used for calculating the loss correction coefficient. FIG. 7(B) is a diagram illustrating an example of the loss calculating function $f_3$.

Figure 8:
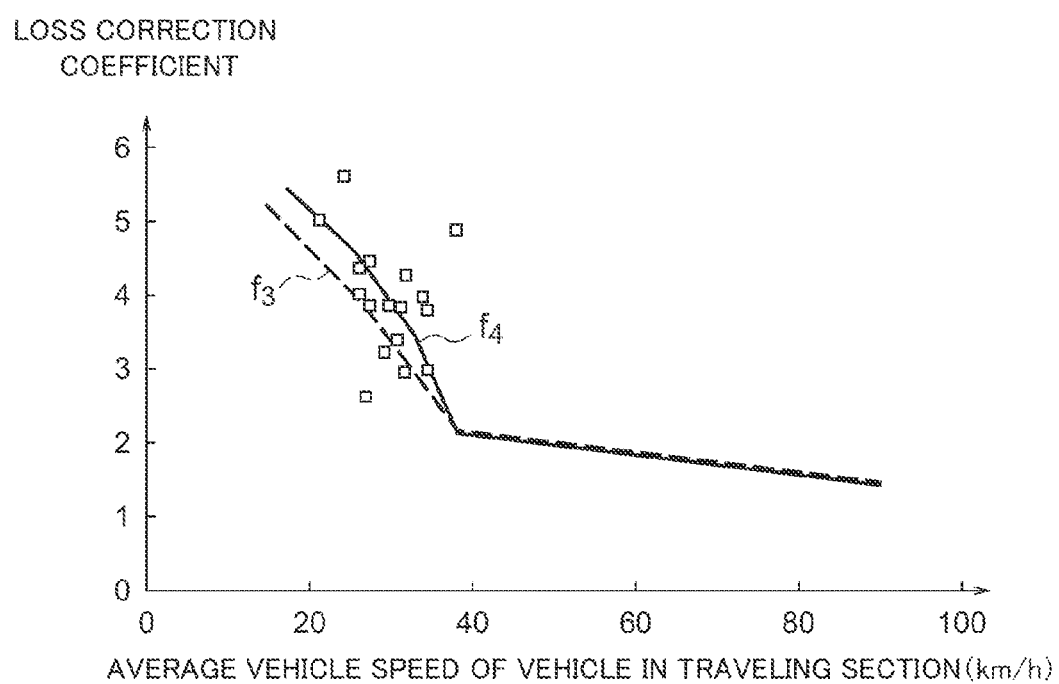
FIG. 8 is a diagram illustrating an example of a loss correction coefficients when a traveling section is inclined.

Further, when the traveling section is inclined, the amount of work of a motor or a gear is larger than a case in which the traveling section is flat. For that reason, in the embodiment, as illustrated in FIG. 8, a loss calculating function $f_4$ used when the traveling section is inclined is stored in advance in the correction coefficient storing unit 140 separately from the loss calculating function $f_3$ used when the traveling section is not inclined. FIG. 8 is a diagram illustrating an example of the loss calculating function $f_4$ used when the traveling section is inclined. In FIG. 8, the experiment values of loss coefficients obtained by an experiment in the inclined traveling section is indicated by a white square plot. Further, for convenience of description, the loss calculating function $f_3$ used when the traveling section is not inclined is also illustrated in the drawing.

As illustrated in FIG. 8, when the average speed $V_{ave}$ of the traveling section is low (for example, a speed lower than 35 km/h), the value of the loss correction coefficient calculated by the loss calculating function $f_4$ is larger than that of the loss correction coefficient calculated by the loss calculating function $f_3$. In this way, the loss correction coefficient calculated by the loss calculating function $f_4$ is stored as a value larger than the loss correction coefficient calculated by the loss calculating function $f_3$. For that reason, even when the traveling section is inclined and the amount of work of a motor or a gear in the traveling section is large, it is possible to appropriate correct the integrated value of loss of the drive-train in the traveling section.

Further, the loss calculating function $f_4$ used when the traveling section is inclined is set so that the loss correction coefficient can be calculated in response to an inclination degree of the traveling section. That is, the loss calculating function $f_4$ illustrated in FIG. 8 exemplarily shows the loss calculating function $f_4$ at a predetermined inclination degree. The loss correction coefficient $f_4$ stored in the correction coefficient storing unit 140 is set so that one loss correction coefficient can be calculated in response to the average vehicle speed $V_{ave}$ and the inclination of the traveling section. Further, in the embodiment, the loss calculating function $f_4$ can be set so that the loss correction coefficient is larger according as the inclination of the traveling section is larger.

The correction coefficient calculating unit 150 calculates the air resistance correction coefficient for correcting the integrated value of air resistance in the traveling section. The correction coefficient calculating unit 150 calculates the integrated value of air resistance by using the air resistance calculating function stored in the correction coefficient storing unit 140. Further, the correction coefficient calculating unit 150 calculates the loss correction coefficient for correcting the integrated value of loss in the drive-train in the traveling section by using the loss calculating function stored in the correction coefficient storing unit 140. The air resistance correction coefficient and the loss correction coefficient calculated by the correction coefficient calculating unit 150 are used to predict energy consumption to the destination by the energy consumption predicting unit 130.

The charging necessity determining unit 160 determines whether to charge the battery on the basis of the prediction result of the energy consumption predicting unit 130. Specifically, the charging necessity determining unit 160 compares the remaining amount of current battery energy with the energy consumption to the destination predicted by the energy consumption predicting unit 130. The charging necessity determining unit 160 determines that the battery needs to be charged when the energy consumption to the destination is larger than the remaining amount of current battery energy. The determination result obtained by the charging necessity determining unit 160 is transmitted to the charging station searching unit 170 and the display unit 180.

When the charging necessity determining unit 160 determines that the battery needs to be charged, the charging station searching unit 170 searches for the charging station at which the vehicle can arrive by the remaining amount of current battery energy. The search result of the charging station searching unit 170 is transmitted to the display unit 180.

The display unit 180 displays the information including the energy consumption to the destination predicted by the energy consumption predicting unit 130, the determination result obtained by the charging necessity determining unit 160, and the charging station searched by the charging station searching unit 170 on the display 500 as the information to suggest for the passenger of the own vehicle.

Figure 9:
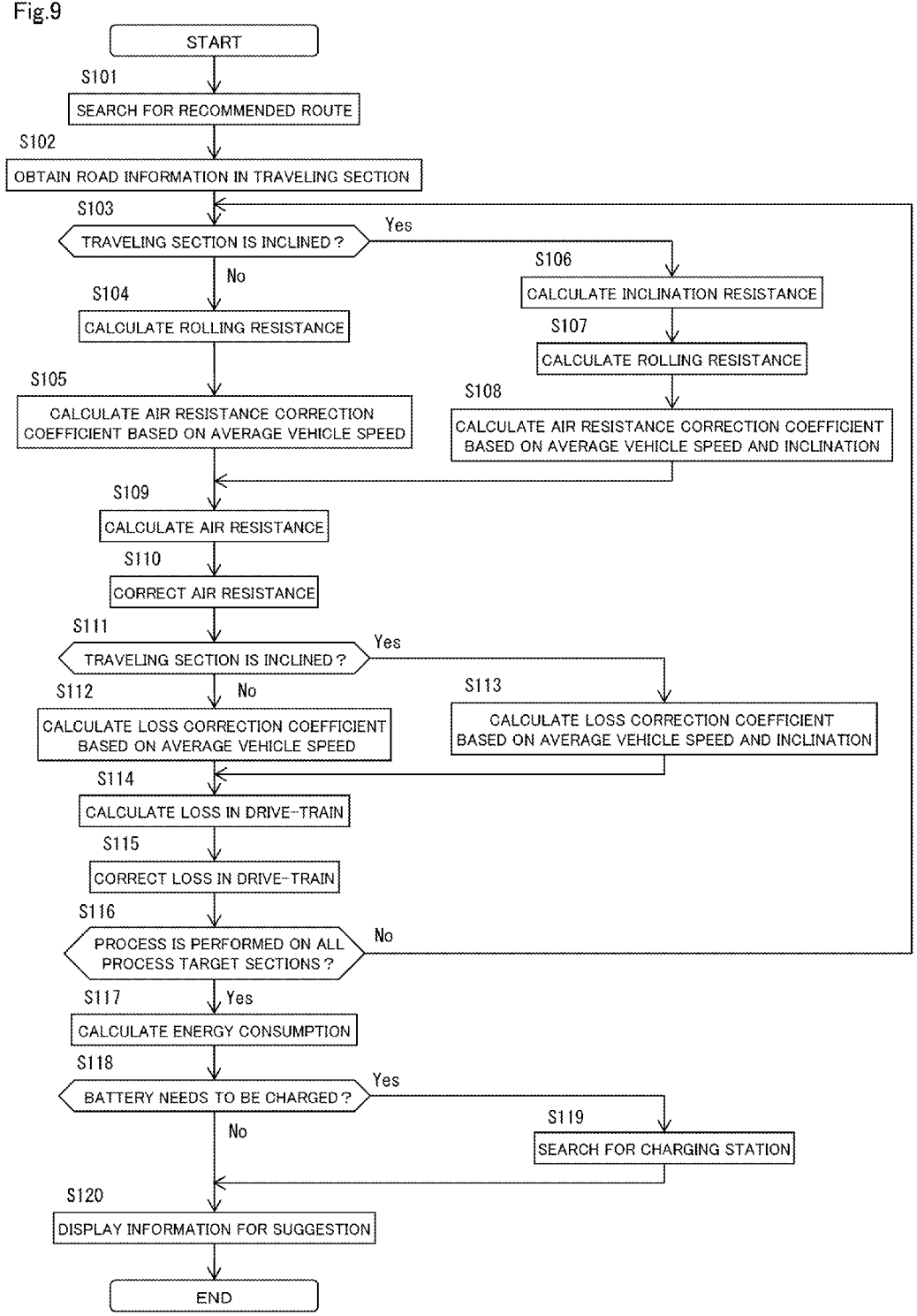
FIG. 9 is a flowchart illustrating a process for predicting energy consumption according to the first embodiment.

A process or sequence for predicting the energy consumption will be described with reference to FIG. 9. FIG. 9 is a flowchart illustrating the process or sequence for predicting the energy consumption according to the first embodiment of the present invention. For example, the process or sequence for predicting the energy consumption is performed when the passenger inputs a destination through the input device 200.

In step S101, the recommended route searching unit 120 searches for the recommended route from the current position to the destination. Specifically, the recommended route searching unit 120 searches for the recommended route on the basis of the map information obtained by the map information obtaining unit 110, the destination input by the input device 200, and the current position of the own vehicle detected by the own vehicle position detecting device 300.

In step S102, the road information of the recommended route searched in step S101 is obtained by the map information obtaining unit 110. The road information includes the traveling distance information, the altitude information, and the average vehicle speed information of each predetermined traveling section (for example, a road link or the like) in the recommended route. For example, when the traveling section of the recommended route is divided into five traveling sections, the map information obtaining unit 110 obtains the road information including the traveling distance information, the altitude information, and the average vehicle speed information for each of five traveling sections.

Figure 10:
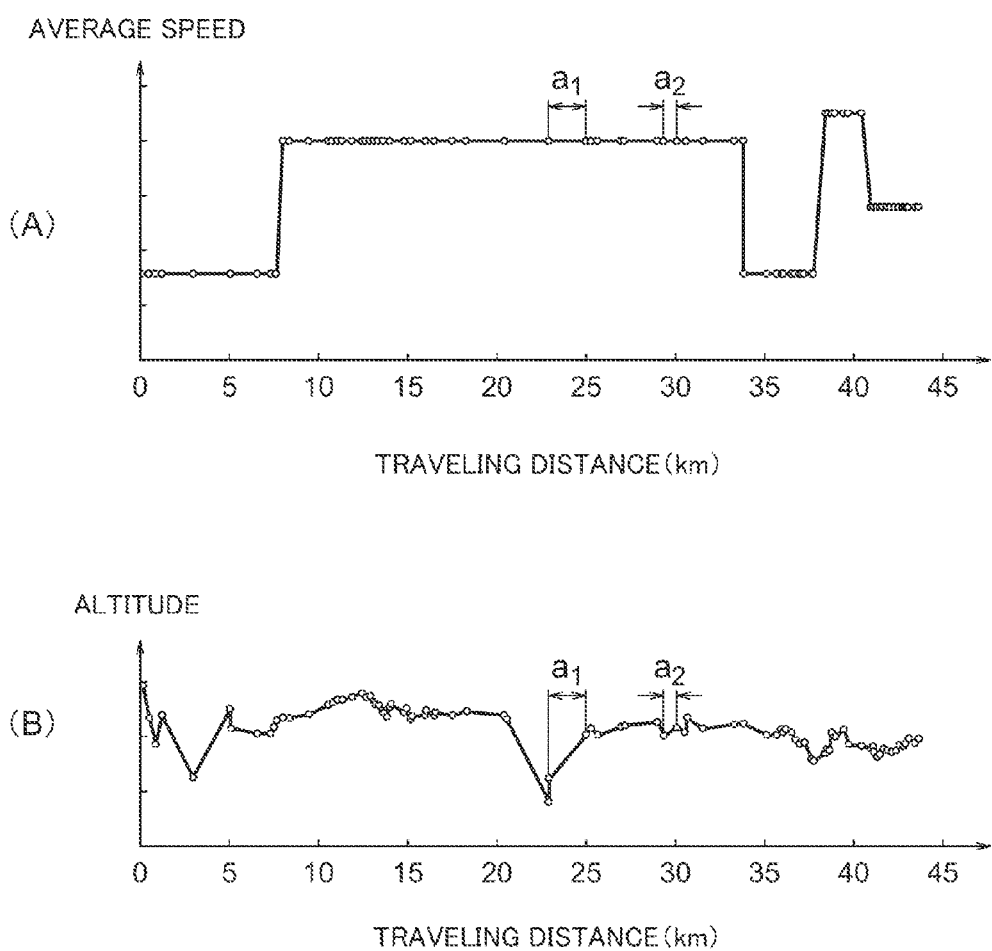
FIG. 10(A) is a diagram illustrating an example of an average vehicle speed in each traveling section of a recommended route.
FIG. 10(B) is a diagram illustrating an example of an altitude of each traveling section of a recommended route.

Here, FIG. 10 illustrates an example of the road information obtained by the map information obtaining unit 110. FIG. 10(A) illustrates the average vehicle speed $V_{ave}$ in each traveling section of the recommended route. FIG. 10(B) illustrates the altitude in each traveling section of the recommended route. Further, in FIG. 10(A), the horizontal axis indicates the traveling distance of the recommended route, and the line graph indicates the average vehicle speed $V_{ave}$. The range (for example, $a_1$ and $a_2$ of FIG. 10(A)) between the points of the line indicates the average vehicle speed $V_{ave}$ of one traveling section. Similarly, even in FIG. 10(B), the horizontal axis indicates the traveling distance of the recommended route, and the line graph indicates the altitude. The range (for example, $a_1$ and $a_2$ of FIG. 10(B)) between the points on the line indicates the altitude of one traveling section. In this way, the map information obtaining unit 110 obtains the road information including the traveling distance of each traveling section, the altitude, and the average vehicle speed of the traveling section.

The processes in step S103 to step S116 are performed each traveling section of the recommended route. In the description below, the traveling section which is a target in process in step S103 to step S116 will be described as the target section.

First, in step S103, the energy consumption predicting unit 130 determines whether the target section is inclined. For example, the energy consumption predicting unit 130 calculates the inclination of the target section as illustrated in the following formula (4) on the basis of the altitude information and the traveling distance information obtained in step S102. The energy consumption predicting unit 130 determines whether the target section is inclined on the basis of the calculated inclination of the target section.

INCLINATION (%)=100×ALTITUDE DIFFERENCE(m)/TRAVELING DISTANCE(m) (4)

When the target section is not inclined, the routine proceeds to step S104. On the other hand, when the target section is inclined, the routine proceeds to step S106. Further, the energy consumption predicting unit 130 may determine that the target section is inclined, for example, when the inclination of the target section is equal to or larger than 1%. The energy consumption predicting unit 130 also may determine that the target section is inclined, for example, when the inclination of the target section is equal to or smaller than −1%.

In step S104, the integrated value of rolling resistance Fr in the target section is calculated by the energy consumption predicting unit 130. Specifically, the energy consumption predicting unit 130 calculates it on the basis of the traveling distance information of the target section obtained in step S102 as illustrated in the following formula (5).

[Formula 4]

INTEGRATED VALUE OF ROLLING RESISTANCE $Fr=\mu W g * d$ (5)

In the formula (5), μ indicates the rolling resistance coefficient, W indicates the vehicle weight, g indicates the gravity acceleration, and d indicates the traveling distance of the target section.

Further, in step S105, the air resistance correction coefficient α of the target section is calculated by the correction coefficient calculating unit 150. Specifically, the correction coefficient calculating unit 150 calculates it on the basis of the average vehicle speed $V_{ave}$ of the target section and the correction coefficient calculating function $f_1$ as illustrated in the following formula (6). The correction coefficient calculating function $f_1$ is a function used when the traveling section is not inclined and stored in the correction coefficient storing unit 140.

[Formula 5]

AIR RESISTANCE CORRECTION COEFFICIENT $\alpha = f_1(V_{ave})$ (6)

On the other hand, in step S103, when it is judged that the target section is inclined, the routine proceeds to step S106. In step S106, since it is judged that the target section is inclined, inclination resistance Fi of the target section is calculated by the energy consumption predicting unit 130. Specifically, the energy consumption predicting unit 130 calculates it on the basis of the following formula (7).

[Formula 6]

INTEGRATED VALUE OF INCLINATION RESISTANCE $Fi = Wg \sin \theta * d$ (7)

In the formula (7), W indicates the vehicle weight, g indicates the gravity acceleration, θ indicates the inclination of the target section, and d indicates the traveling distance of the target section.

In step S107, the integrated value of the rolling resistance Fr of the target section is calculated similarly to step S104.

Then, in step S108, the air resistance correction coefficient of the target section is calculated by the correction coefficient calculating unit 150. In step S108, it is judged that the target section is inclined. For that reason, the correction coefficient calculating unit 150 calculates the air resistance correction coefficient α of the target section on the basis of the inclination angle θ of the target section, the average vehicle speed $V_{ave}$ of the target section, and the correction coefficient calculating function $f_2$ as illustrated in the following formula (8). The correction coefficient calculating function $f_2$ is a function used when the traveling section is inclined.

[Formula 7]

AIR RESISTANCE CORRECTION COEFFICIENT $\alpha = f_2(V_{ave}, \theta)$ (8)

In step S109, the integrated value of the air resistance Fa of the target section is calculated by the energy consumption predicting unit 130. Specifically, the energy consumption predicting unit 130 calculates it on the basis of the traveling distance d of the target section and the average speed $V_{ave}$ of the target section obtained in step S102 as illustrated in the following formula (9).

[Formula 8]

INTEGRATED VALUE OF AIR RESISTANCE $Fa = kV^2 * d$ (9)

In the formula (9), k is a parameter relating to air resistance which includes air resistance coefficient or the projected area of the vehicle.

In step S110, the integrated value of air resistance Fa calculated in step S109 is corrected by the energy consumption predicting unit 130. Specifically, the energy consumption predicting unit 130 corrects it on the basis of the air resistance correction coefficient α calculated in step S105 or step S108 and the integrated value of the air resistance Fa calculated in step S109 as illustrated in the following formula (10). In the description below, the integrated value of the air resistance Fa which is corrected in step S110 will be described as the integrated value of the air resistance correction value Fa'.

[Formula 9]

INTEGRATED VALUE OF AIR RESISTANCE CORRECTION VALUE Fa'=INTEGRATED VALUE OF AIR RESISTANCE Fa*AIR RESISTANCE CORRECTION COEFFICIENT α (10)

Next, in step S111, it is judged whether the target section is inclined similarly to step S103. When the target section is not inclined, the routine proceeds to step S112. On the other hand, when the target section is inclined, the routine proceeds to step S113.

In step S112, the loss correction coefficient 13 of the target section is calculated by the correction coefficient calculating unit 150. In step S112, it is determined that the process target section is not inclined. For that reason, the correction coefficient calculating unit 150 calculates it on the basis of the average speed $V_{ave}$ of the target section obtained in step S102 and the loss calculating function $f_3$ as illustrated in the following formula (11). The loss calculating function $f_3$ is a function used when the traveling section is not inclined and stored in the correction coefficient storing unit 140.

[Formula 10]

$$\text{LOSS CORRECTION COEFFICIENT } \beta = f_3(V_{ave}) \quad (11)$$

On the other hand, in step S111, when it is judged that the target section is inclined, the routine proceeds to step S113. In step S113, it is determined that the target section is inclined. For that reason, the correction coefficient calculating unit 150 calculates the loss correction coefficient β of the target section on the basis of the average speed $V_{ave}$ of the target section obtained in step S102 and the loss calculating function $f_4$ as illustrated in the following formula (12). The loss calculating function $f_4$ is a function used when the traveling section is inclined and stored in the correction coefficient storing unit 140.

[Formula 11]

$$\text{LOSS CORRECTION COEFFICIENT } \beta = f_4(V_{ave}, \theta) \quad (12)$$

Then, in step S114, the integrated value of loss L in the drive-train of the target section is calculated by the energy consumption predicting unit 130. Specifically, the energy consumption predicting unit 130 calculates it on the basis of the integrated value of the air resistance correction value Fa' calculated in step S110 and the integrated value of the rolling resistance Fr calculated in step S104 or step S107 as illustrated in the following formula (13).

[Formula 12]

$$\text{INTEGRATED VALUE OF LOSS } L \text{ IN DRIVE-TRAIN} = \quad (13)$$

$$\frac{((\text{INTEGRATED VALUE OF ROLLING RESISTANCE } Fr + \text{INTEGRATED VALUE OF AIR RESISTANCE } Fa'))}{\text{MOTOR EFFICIENCY} * \text{GEAR EFFICIENCY}} -$$

$$((\text{INTEGRATED VALUE OF ROLLING RESISTANCE } Fr + \text{INTEGRATED VALUE OF AIR RESISTANCE } Fa'))$$

In step S115, the integrated value of the loss L in the drive-train in the target section calculated in step S114 is corrected by the energy consumption predicting unit 130. Specifically, the energy consumption predicting unit 130 corrects it on the basis of the integrated value of the loss L in the drive-train calculated in step S114 and the loss correction coefficient β calculated in step S112 or step S113 as illustrated in the following formula (14). Further, in the description below, the integrated value of the loss L corrected in step S115 will be described as the integrated value of the loss correction value L'.

[Formula 13]

$$\text{INTEGRATED VALUE OF LOSS CORRECTION VALUE } L' = \text{INTEGRATED VALUE OF LOSS } L * (\text{LOSS CORRECTION COEFFICIENT } \beta) \quad (14)$$

In step S116, the energy consumption predicting unit 130 judges whether the processes of step S103 to step S115 are performed in all traveling sections of the recommended route. When the processes of step S103 to step S115 are performed in all traveling sections of the recommended route, the routine proceeds to step S117. On the other hand, when there is a traveling section in which the processes of step S103 to step S115 are not performed, the routine returns to step S103 so as to perform the processes of step S103 to step S115 in the traveling section in which the processes are not performed yet.

Next, in step S117, the energy consumption from the current position to the destination is predicted by the energy consumption predicting unit 130. Specifically, the energy consumption predicting unit 130 adds the integrated value of the rolling resistance Fr, the integrated value of the inclination resistance Fi, the integrated value of the air resistance correction value Fa', and the integrated value of the loss corrected value L' in each traveling section of the recommended route. The added integrated value is the energy consumption each traveling section. The energy consumption predicting unit 130 sums up the energy consumption of the traveling sections as the energy consumption of the recommended route. Specifically, the energy consumption predicting unit 130 calculates the energy consumption of the recommended route on the basis of the following formula (15). The information of the energy consumption predicted by the energy consumption predicting unit 130 is transmitted to the display unit 180.

[Formula 14]

$$\text{ENERGY CONSUMPTION TO DESTINATION} = \quad (15)$$

$$\sum \begin{Bmatrix} \text{INTEGRATED VALUE OF} \\ \text{ROLLING RESISTANCE } Fr + \\ \text{INTEGRATED VALUE OF INCLINATION} \\ \text{RESISTANCE } Fi + \\ \text{INTEGRATED} \\ \text{VALUE OF AIR RESISTANCE} \\ \text{CORRECTION VALUE } Fa' + \\ \text{INTEGRATED VALUE} \\ \text{OF LOSS CORRECTION} \\ \text{VALUE } L' \text{ IN DRIVE-TRAIN} \end{Bmatrix}$$

In step S118, the charging necessity determining unit 160 determines whether to charge the battery until the vehicle reaches the destination on the basis of the predicted energy consumption to the destination in step S117. Specifically, the charging necessity determining unit 160 determines that the battery needs to be charged when the energy consumption to the destination is larger than the remaining amount of battery energy. The charging necessity determining unit 160 determines that the battery does not need to be charged when the energy consumption to the destination is equal to or smaller than the remaining amount of battery energy. The result determined by the charging necessity determining unit 160 is transmitted to the display unit 180.

In step S118, when it is determined that the battery needs to be charged, the routine proceeds to step S119. In step S119, the charging station around the vehicle is searched by the charging station searching unit 170. Specifically, the charging station searching unit 170 searches for the charging station at which the vehicle can arrive by the remaining amount of current battery energy on the basis of the map information obtained by the map database 400 and the current position of the vehicle detected by the own vehicle position detecting device 300. Then, the information of the charging station searched by the charging station searching unit 170 is transmitted to the display unit 180.

In step S120, the display unit 180 display the information including the energy consumption to the destination on the display 500 to suggest the passenger. Specifically, the display unit 180 displays the information including the energy consumption to the destination predicted in step S117, the charging necessity determination result in step S118, and the position of the charging station searched in step S119 on the screen of the display 500. Accordingly, these kinds of information are suggested to the passenger.

As described above, in the first embodiment of the present invention, the integrated value of air resistance to the destination is corrected in consideration of the air resistance caused by the acceleration of the vehicle when the energy consumption to the destination is predicted. Further, the integrated value of loss in the drive-train to the destination is corrected in consideration of the loss in the drive-train caused by the acceleration of the vehicle. Accordingly, in the embodiment, it is possible to highly precisely predict the integrated value of air resistance to the destination and the integrated value of loss in the drive-train. As a result, it is possible to appropriately predict the energy consumption to the destination. Particularly, since the electric vehicle has a feature that the battery is heavy and the traveling distance is short compared to an engine vehicle, it is desirable to highly precisely determine whether the vehicle reaches the destination. In the embodiment, it is possible to highly precisely predict the energy consumption to the destination in such a case. As a result, it is possible to highly precisely determine whether the vehicle reaches the destination.

Figure 11:
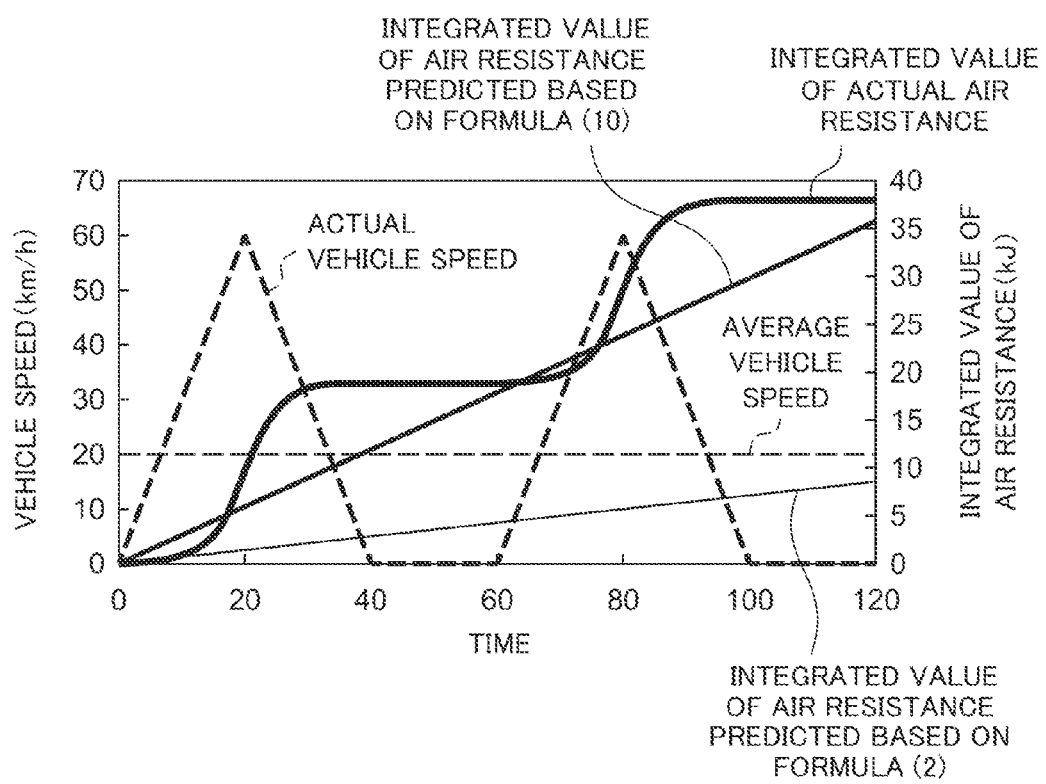
FIG. 11 is a graph illustrating an example of a temporal transition of an actual vehicle speed, an average vehicle speed, an integrated value of actual air resistance, an integrated value of air resistance predicted on the basis of the following formula (2), and an integrated value of air resistance predicted on the basis of the following formula (10) in a predetermined traveling section.

FIG. 11 is a graph illustrating an example of a temporal transition of the actual vehicle speed, the average vehicle speed, and the integrated value of actual air resistance in a predetermined traveling section. In FIG. 11, the graph also illustrates the integrated value of air resistance predicted on the basis of the formula (2) and the integrated value of air resistance predicted on the basis of the formula (10) in a predetermined traveling section. In FIG. 11, the actual vehicle speed and the average vehicle speed are respectively indicated by a dashed line. In FIG. 11, the integrated value of actual air resistance, the integrated value of air resistance predicted on the basis of the formula (2), and the integrated value of air resistance predicted on the basis of the formula (10) are respectively indicated by a solid line. Further, the actual vehicle speed and the average vehicle speed of FIG. 11 correspond to the vehicle speed (km/h) at the left side of the graph. And the integrated value of actual air resistance, the integrated value of air resistance predicted on the basis of the formula (2), and the integrated value of air resistance predicted on the basis of the formula (10) correspond to the integrated value of air resistance (kJ) at the right side of the graph in FIG. 11. Further, the actual air resistance is the air resistance obtained by an experiment from the profile of the travel speed when the vehicle actually travels in the traveling section (the same applies to FIGS. 12 and 13 below).

Figure 12:
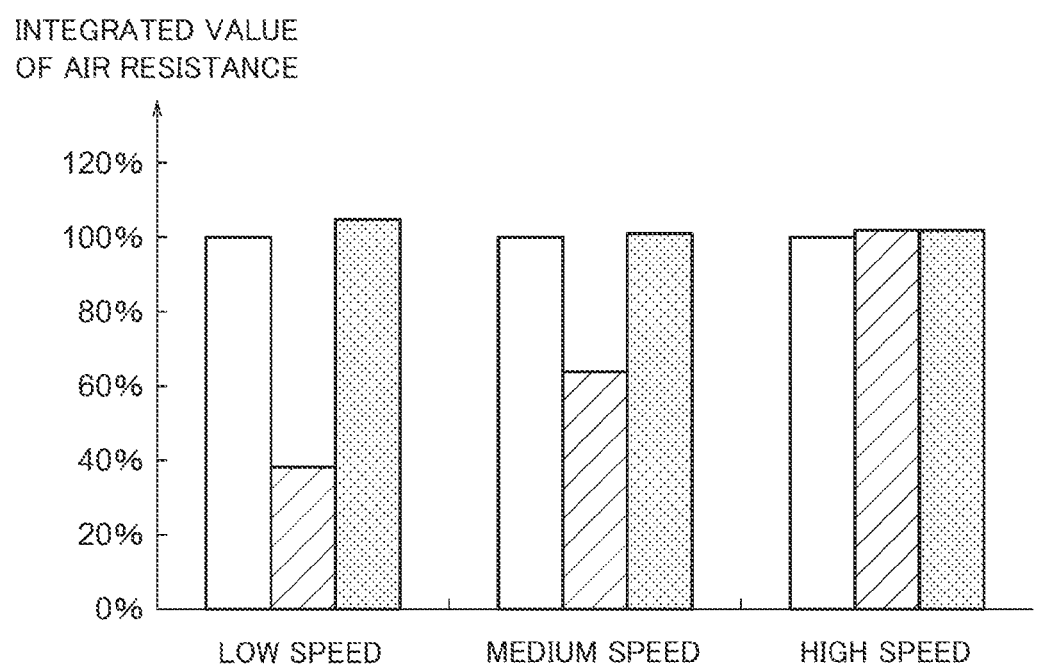
FIG. 12 is a graph illustrating an example of an integrated value of actual air resistance, an integrated value of air resistance predicted on the basis of the following formula (2), and an integrated value of air resistance predicted on the basis of the following formula (10) in a predetermined traveling section.

The air resistance is proportional to the square of the vehicle speed when the vehicle travels at a constant vehicle speed. On the contrary, the air resistance is proportional to the cube of the vehicle speed when the vehicle is accelerated. For that reason, as illustrated in FIG. 12, an error was caused between the actual air resistance (indicated by white bar graph in FIG. 12) and the air resistance predicted on the basis of the constant average vehicle speed $V_{ave}$ as illustrated in the formula (2) (indicated by diagonal hatching bar graph in FIG. 12) as much as the vehicle accelerates. For example, in the example illustrated in FIG. 12, the air resistance predicted on the basis of the formula (2) is approximately ¼ of the actual air resistance at maximum. On the contrary, since the air resistance (indicated by gray bar graph in FIG. 12) predicted by the air resistance correction coefficient α as illustrated in the formula (10) corrects the air resistance in consideration of the acceleration of the vehicle, the air resistance substantially is equal to the actual air resistance.

FIG. 12 is a graph illustrating an example of the integrated value of actual air resistance (indicated by white bar graph in FIG. 12) in a predetermined traveling section, the integrated value of air resistance predicted from the average vehicle speed $V_{ave}$ of the traveling section on the basis of the formula (2) (indicated by diagonal hatching bar graph in FIG. 12), and the integrated value of air resistance predicted by using the air resistance correction coefficient α on the basis of the formula (10) (indicated by gray bar graph in FIG. 12). Further, FIG. 12 illustrates the air resistance predicted on the basis of the formula (10) and the air resistance predicted on the basis of the formula (2) while the actual air resistance by an experiment is set as 100%.

More specifically, as illustrated in FIG. 12, when the vehicle speed is low, an error between the actual air resistance and the air resistance predicted on the basis of the formula (2) is approximately 60%. On the contrary, an error between the actual air resistance and the air resistance predicted on the basis of the formula (10) is approximately 5%. In the air resistance predicted on the basis of the formula (10), the error with respect to the actual air resistance is small compared to the air resistance predicted on the basis of the formula (2). Similarly, even when the vehicle speed is medium, an error with respect to the actual air resistance is small in the air resistance predicted on the basis of the formula (10) compared to the air resistance predicted on the basis of the formula (2).

In this way, the navigation device 1 of the embodiment corrects the integrated value of air resistance calculated on the basis of the constant average vehicle speed $V_{ave}$ as illustrated in the formula (10) in consideration of the air resistance increased by acceleration. Accordingly, it is possible to effectively prevent a problem in which the integrated value of air resistance of the traveling section is predicted as a value smaller than the integrated value of actual air resistance. Further, the navigation device 1 of the embodiment calculates the air resistance correction coefficient α so that the integrated value of air resistance in the traveling section is larger according as the average vehicle speed $V_{ave}$ in the traveling section is lower. Then, the navigation device 1 corrects the integrated value of air resistance on the basis of the calculated air resistance correction coefficient α. Accordingly, even when the average vehicle speed $V_{ave}$ is low and the frequency of acceleration is high in the traveling section, it is possible to appropriately predict the integrated value of air resistance.

Further, the navigation device 1 of the embodiment calculates the air resistance correction coefficient α so that the integrated value of air resistance in the traveling section is small when the traveling section is inclined. Because there is a tendency that the frequency of acceleration is low when the traveling section is inclined compared to a case in which the traveling section is not inclined. Accordingly, even when the traveling section is inclined, it is possible to appropriately predict the air resistance in the traveling section.

Figure 13:
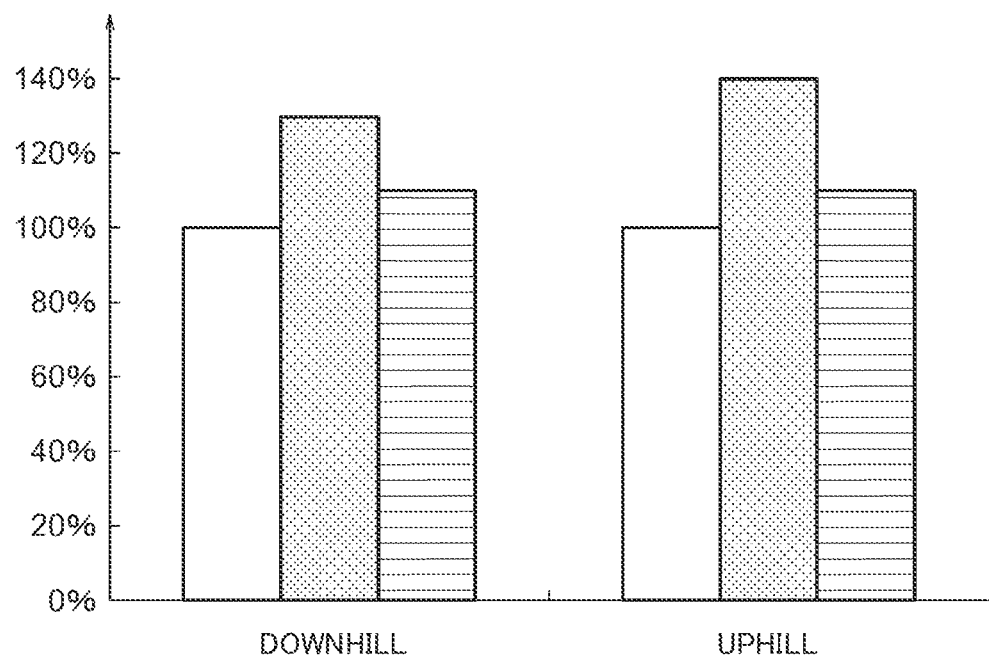
FIG. 13 is a graph illustrating an example of an integrated value of actual air resistance when a traveling section is inclined, an integrated value of air resistance predicted by using an air resistance correction coefficient α when the traveling section is flat, and an integrated value of air resistance predicted by using an air resistance correction coefficient α when the traveling section is inclined.

FIG. 13 is a graph illustrating an example of the integrated value of actual air resistance when the traveling section is inclined (indicated by white bar graph in FIG. 13), the integrated value of air resistance predicted by using the air resistance correction coefficient α of the traveling section being flat (indicated by gray bar graph in FIG. 13), and the integrated value of air resistance predicted by using the air resistance correction coefficient α of the traveling section being inclined (indicated by horizontal hatching bar graph in FIG. 13).

As illustrated in FIG. 13, in a case in which the traveling section is a downhill having a predetermined inclination, when the integrated value of air resistance is predicted by using the air resistance correction coefficient α of the traveling section being flat, the predicted integrated value of air resistance is larger than the integrated value of actual air resistance by about 30%. On the contrary, in the same case, when the integrated value of air resistance is predicted by using the air resistance correction coefficient α of the traveling section being inclined, the predicted integrated value of air resistance is larger than the integrated value of actual air resistance by about 10%. That is, when the integrated value of air resistance is predicted by using the air resistance correction coefficient cc of the traveling section being inclined, it is possible to predict a value substantially equal to the actual air resistance compared to using the air resistance correction coefficient α of the traveling section being flat. Similarly, even in a case in which the traveling section is an uphill having a predetermined inclination, when the integrated value of air resistance is predicted by the air resistance correction coefficient α of the traveling section being inclined, it is possible to predict a value close to the actual air resistance compared to using the air resistance correction coefficient α of the traveling section being flat. In this way, the navigation device 1 of the embodiment can effectively prevent a problem in which the integrated value of air resistance to the destination is predicted as a value larger than the integrated value of actual air resistance. Because when the traveling section is inclined, the navigation device 1 predicts the integrated value in consideration of the inclination of the traveling section, and predicts by using the air resistance correction coefficient α of the traveling section being inclined.

Further, the navigation device 1 of the embodiment corrects the integrated value of loss in the drive-train calculated on the basis of the average vehicle speed of the traveling section as illustrated in the formula (3). Because the loss in the drive-train such as the motor or the gear increases when the vehicle is accelerated.

Figure 14:
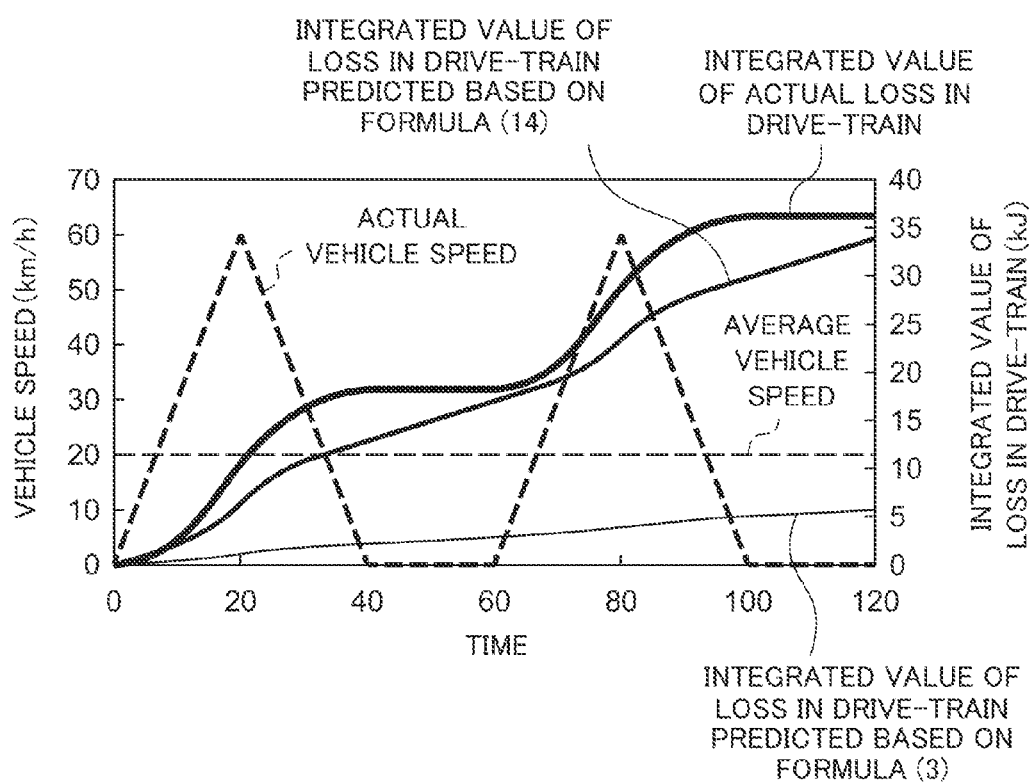
FIG. 14 is a graph illustrating an example of a temporal transition of an actual vehicle speed, an average vehicle speed, and an integrated value of actual loss in a drive-train, an integrated value of loss in a drive-train predicted on the basis of the following formula (3) and an integrated value of loss in a drive-train predicted on the basis of the formula (14) in a predetermined traveling section.

FIG. 14 is a graph illustrating an example of a temporal transition of the actual vehicle speed, the average vehicle speed, and the integrated value of actual loss in the drive-train in a predetermined traveling section. In FIG. 14, the graph also illustrates the integrated value of loss in the drive-train predicted on the basis of the average vehicle speed $V_{ave}$ in the traveling section as illustrated in the formula (3) and the integrated value of loss in the drive-train predicted on the basis of the loss correction coefficient β as illustrated in the formula (14). In FIG. 14, the actual vehicle speed and the average vehicle speed of the traveling section are respectively indicated by a dashed line. In FIG. 14, the integrated value of actual loss in the drive-train, the integrated value of loss in the drive-train predicted on the basis of the formula (3), and the integrated value of loss in the drive train predicted on the basis of the formula (10) are respectively indicated by a solid line. Further, in FIG. 14, the actual vehicle speed and the average vehicle speed $V_{ave}$ in the traveling section correspond to the vehicle speed (km/h) at the left side of the graph. The integrated value of actual loss in the drive-train in the traveling section, the integrated value of loss in the drive-train predicted on the basis of the formula (3), and the integrated value of loss in the drive-train predicted on the basis of the formula (14) correspond to the integrated value of loss (kJ) in the drive-train at the right side of the graph. The actual loss in the drive-train is the loss obtained by an experiment from the profile of the travel speed obtained when the vehicle actually travels in the traveling section (the same applies to FIGS. 15 and 16 below).

Figure 15:
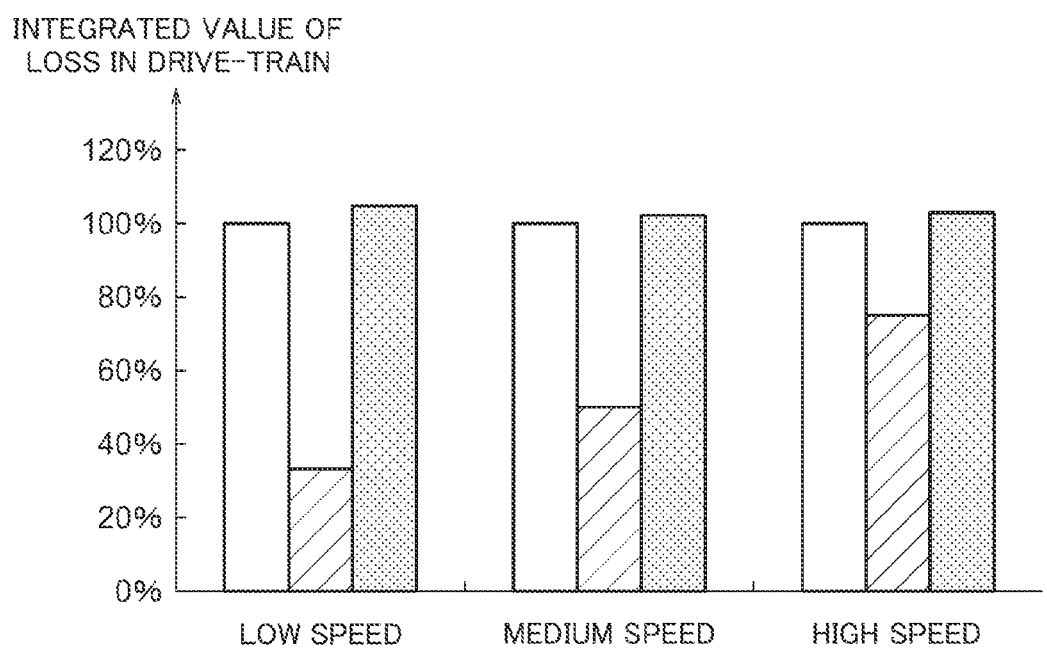
FIG. 15 is a graph illustrating an example of an integrated value of actual loss in a drive-train, an integrated value of loss in a drive-train predicted on the basis of the following formula (3), and an integrated value of loss in a drive-train predicted on the basis of the following formula (14) in a predetermined traveling section.

When the vehicle is accelerated, the loss in the drive-train includes the loss caused by the inertia moment and the loss caused by the travel resistance. For that reason, as illustrated in FIG. 15, an error is caused between the integrated value of actual loss in the drive-train and the integrated value of loss in the drive-train predicted on the basis of the formula (3) as much as the vehicle accelerates. For example, in the example illustrated in FIG. 15, the integrated value of loss in the drive-train predicted on the basis of the formula (3) is approximately ⅙ of the actual loss in the drive-train at maximum. On the contrary, as illustrated in the formula (14), the integrated value of loss in the drive-train predicted by using the loss correction coefficient β corrects the loss in the drive-train in consideration of the acceleration of the vehicle. Therefore, the integrated value of loss is substantially equal to the actual loss in the drive-train.

FIG. 15 is a graph illustrating an example of the integrated value of actual loss in the drive-train in a predetermined traveling section (indicated by white bar graph in FIG. 15), the integrated value of loss in the drive-train predicted by using the average vehicle speed $V_{ave}$ on the basis of the formula (3) (indicated by diagonal hatching bar graph in FIG. 15), and the integrated value of loss in the drive-train predicted by using the loss correction coefficient β on the basis of the formula (14) (indicated by gray bar graph in FIG. 15). FIG. 15 illustrates the integrated value of loss in the drive-train predicted on the basis of the formula (3) and the integrated value of loss in the drive-train predicted on the basis of the formula (14) while the integrated value of actual loss in the drive-train by an experiment is set as 100%.

As illustrated in FIG. 15, when the vehicle speed is low, an error between the integrated value of actual loss in the drive-train and the integrated value of loss in the drive-train predicted on the basis of the formula (3) is 70%. On the contrary, an error between the integrated value of actual loss in the drive-train and the integrated value of loss in the drive-train predicted on the basis of the formula (14) is 5%. With respect to the integrated value of actual loss in the drive-train, an error of the integrated value of loss in the drive-train predicted on the basis of the formula (14) is small compared to an error of the integrated value of loss in the drive-train predicted on the basis of the formula (3). Similarly, even when the vehicle speed is medium or high, with respect to the integrated value of actual loss in the drive-train, an error of the integrated value of loss in the drive-train predicted on the basis of the formula (14) is small compared to an error of the integrated value of loss in the drive-train predicted on the basis of the formula (3).

In this way, the navigation device 1 of the embodiment corrects the integrated value of loss in the drive-train calculated on the basis of the average vehicle speed $V_{ave}$ in consideration of the loss in the drive-train increased by acceleration as illustrated in the formula (14). Accordingly, it is possible to effectively prevent a problem in which the integrated value of loss in the drive-train in the traveling section is predicted as a value smaller than the actual loss in the drive-train. Further, the navigation device 1 of the embodiment calculates the loss correction coefficient β so that the integrated value of loss in the drive-train is larger according as the average vehicle speed $V_{ave}$ is lower. Then, the navigation device 1 corrects the integrated value of loss in the drive-train on the basis of the calculated loss correction coefficient β. Accordingly, even in the traveling section in which the average vehicle speed $V_{ave}$ is low and the frequency of acceleration is high, it is possible to appropriately predict the integrated value of loss in the drive-train in the traveling section.

Further, the navigation device 1 calculates the loss correction coefficient 13 so that the integrated value of loss in the drive-train is large when the traveling section is inclined compared to a case in which the traveling section is not inclined. Because the amount of work is large when the traveling section is inclined compared to a case in which the traveling section is not inclined. Accordingly, even when the traveling section is inclined, it is possible to appropriately predict the loss in the drive-train in the traveling section.

Figure 16:
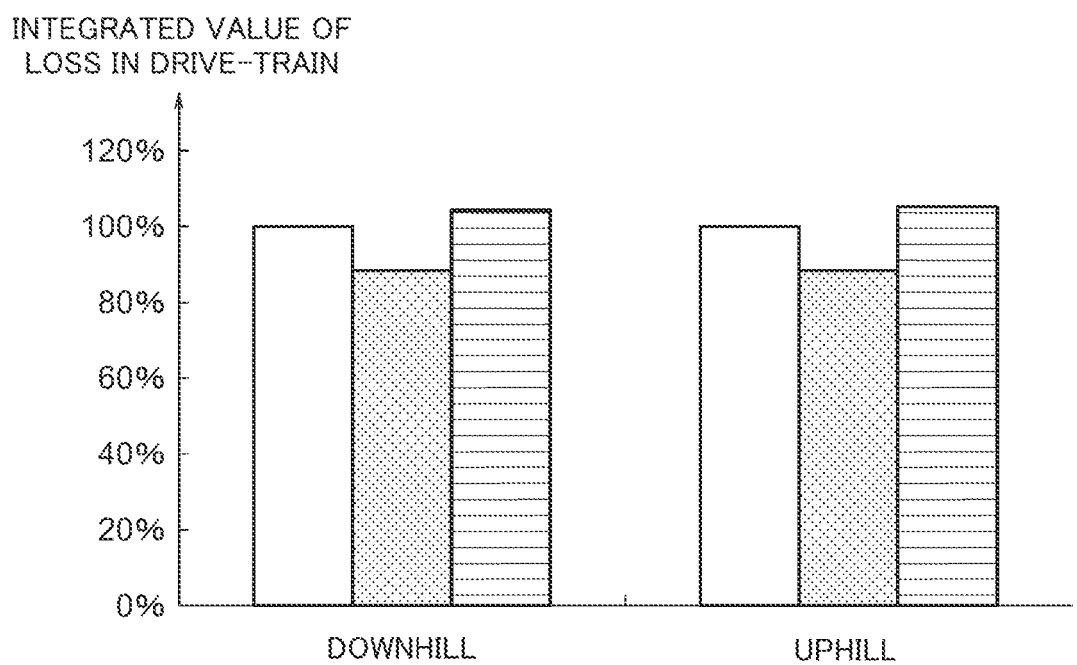
FIG. 16 is a graph illustrating an example of an integrated value of actual loss in a drive-train when a traveling section is inclined, an integrated value of loss in a drive-train predicted by using a loss correction coefficient 13 when the traveling section is flat, and an integrated value of loss in a drive-train predicted by using the loss correction coefficient 13 when the traveling section is inclined.

FIG. 16 is a graph illustrating an example of the integrated value of actual loss in the drive-train when the traveling section is inclined (indicated by white bar graph in FIG. 16), the integrated value of loss in the drive-train predicted by using the loss correction coefficient 13 of the traveling section being flat (indicated by gray bar graph in FIG. 16), and the integrated value of loss in the drive-train predicted by using the loss correction coefficient β of the traveling section being inclined (indicated by a horizontal line bar graph in FIG. 16).

As illustrated in FIG. 16, in a case in which the traveling section is a downhill having a predetermined inclination, when the integrated value of loss in the drive-train is predicted by using the loss correction coefficient β of the traveling section being flat, the predicted integrated value of loss is smaller than the integrated value of actual loss by about 10%. On the contrary, in the same case, when the integrated value of loss in the drive-train is predicted by using the loss correction coefficient β of the traveling section being inclined, the predicted integrated value of loss in the drive-train is larger than the integrated value of actual loss by about 5%. That is, when the integrated value of loss in the drive-train is predicted by using the loss correction coefficient β of the traveling section being inclined, it is possible to predict a value substantially equal to the integrated value of actual loss of the drive-train compared to a case in which the integrated value of loss in the drive-train is predicted by using the loss correction coefficient β of the traveling section being flat.

Similarly, even in a case in which the traveling section is an uphill having a predetermined inclination, when the integrated value of loss in the drive-train is predicted by using the loss correction coefficient β of the traveling section being inclined, it is possible to predict a value close to the actual loss in the drive-train compared to a case in which the integrated value of loss in the drive-train is predicted by using the loss correction coefficient β of the traveling section being flat. In this way, the loss correction coefficient β of the traveling section being inclined is used when the traveling section is inclined. Then it is possible to effectively prevent a problem in which the integrated value of loss in the drive-train to the destination is predicted as a value smaller than the actual value.

Second Embodiment

Figure 17:
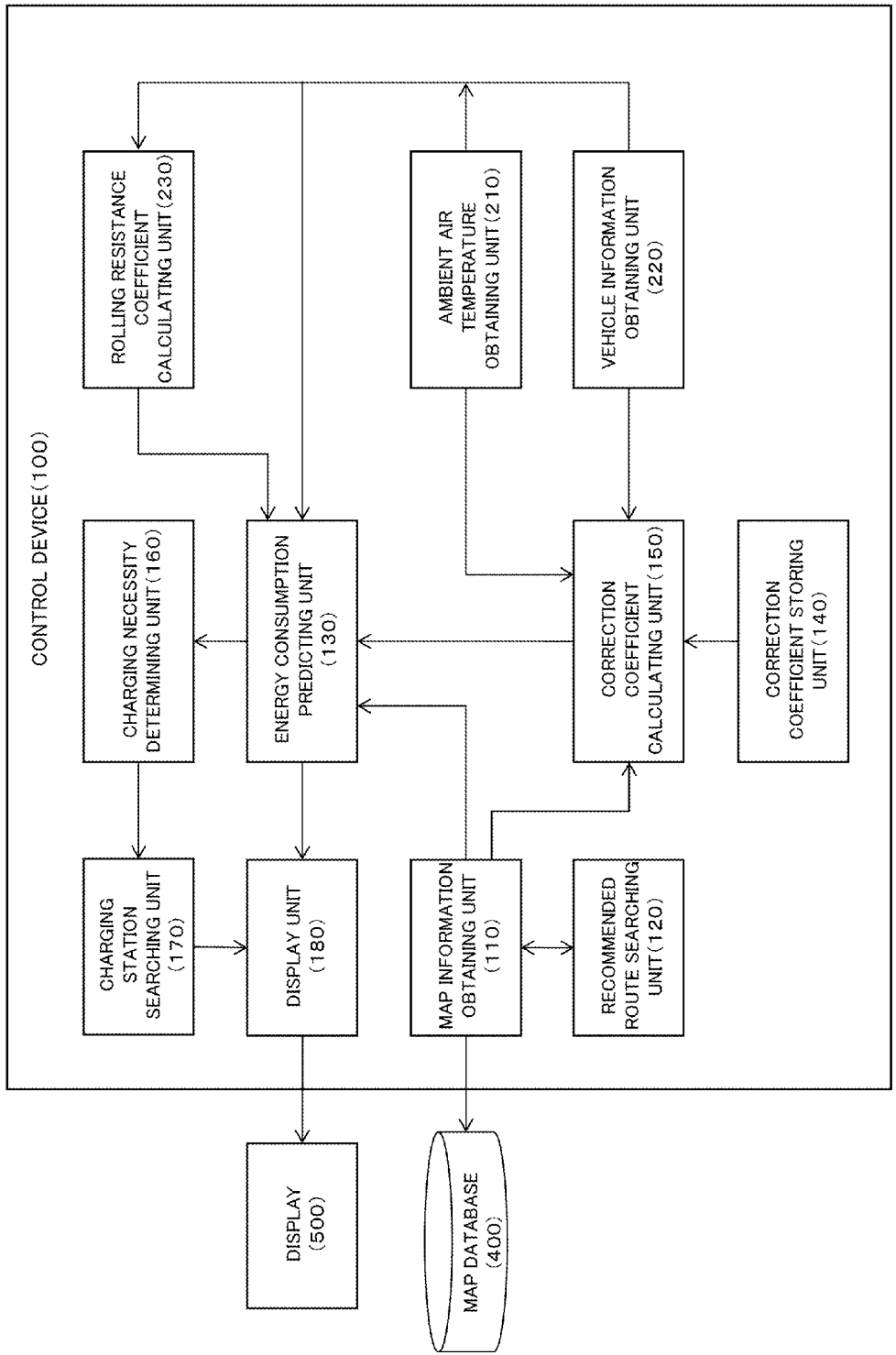
FIG. 17 is a functional block diagram of a control device according to a second embodiment.

Next, a navigation device according to a second embodiment of the present invention will be described. The navigation device 1 according to the second embodiment is similar to the navigation device 1 according to the first embodiment except that the control device 100 has a function illustrated in FIG. 17 and is operated as described below. FIG. 17 is a functional block diagram illustrating a function of the control device 100 according to the second embodiment.

In the second embodiment, as illustrated in FIG. 17, the control device 100 includes an ambient air temperature obtaining unit 210 configured to obtain an ambient air temperature, a vehicle information obtaining unit 220 configured to obtain vehicle information, and a rolling resistance coefficient calculating unit 230 configured to calculate a rolling resistance coefficient in addition to the function according to the first embodiment.

The ambient air temperature obtaining unit 210 obtains an ambient air temperature outside the vehicle. For example, the ambient air temperature obtaining unit 210 can obtain information of the ambient air temperature from an outside air temperature gauge if the vehicle mounts a thermometer detecting the ambient air temperature. Further, the ambient air temperature obtaining unit 210 predicts the ambient air temperature of the vehicle as will be described below even if the vehicle does not mounts the thermometer.

That is, the ambient air temperature obtaining unit 210 predicts the ambient air temperature on the basis of a season, a month, a date, a region of the traveling section, and a latitude and a longitude of the traveling section. Accordingly, the ambient air temperature can be obtained. For example, a condition set by the combination of at least one or more of the season, the month, the date, the region, the latitude, and the longitude at the current time point are stored in the navigation device 1 in advance. Further, a correlation with the above condition and the predicted value of ambient air temperature are stored in the navigation device 1 in advance. Alternatively, the condition and the correlation are obtained from a server (not illustrated). Accordingly, it is possible to predict the ambient air temperature outside the vehicle.

When the ambient air temperature is predicted on the basis of the combination of the season, the month, the date, the region, the latitude, and the longitude, the predicted value of ambient air temperature is obtained at higher precision (the predicted value of ambient air temperature is obtained at smaller temperature interval) according as the ambient air temperature is lower. For example, when the predicted ambient air temperature is equal to or higher than 10° C., the correlation between the condition and the predicted value of ambient air temperature are stored so that the ambient air temperature obtaining unit 210 predicts the ambient air temperature at the temperature interval equal to or higher than 10° C. On the other hand, when the ambient air temperature is lower than 10° C., the correlation between the condition and the predicted value of ambient air temperature are stored so that the ambient air temperature obtaining unit 210 predicts the ambient air temperature at the temperature interval lower than 5° C. In the second embodiment, the rolling resistance of the vehicle is calculated on the basis of the ambient air temperature as will be described later. In this case, an amount of change of the rolling resistance is larger according as the ambient air temperature is lower. For that reason, the ambient air temperature is predicted at smaller prediction temperature interval according as the ambient air temperature is lower. Accordingly, it is possible to highly precisely calculate the rolling resistance of the vehicle.

The vehicle information obtaining unit 220 obtains the vehicle information including a vehicle weight (a vehicle weight except passenger weights), brake hub drag resistance, an air resistance coefficient, and a projected area. The vehicle weight except passenger weights, the brake hub drag resistance, the air resistance coefficient, and the projected area are different in accordance with the type of vehicles. The control device 100 stores these values in advance in the memory in accordance with the type of vehicles. For that reason, the vehicle information obtaining unit 220 can read the vehicle information from the memory of the control device 100.

Figure 18:
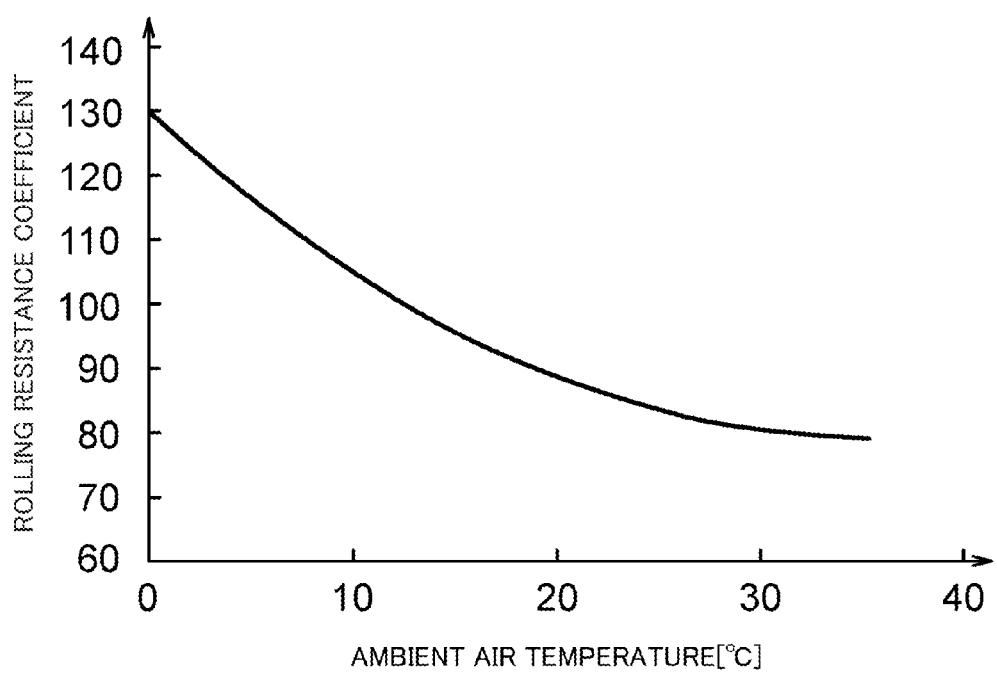
FIG. 18 is a diagram illustrating an example of a correlation of an ambient air temperature and a rolling resistance coefficient.

The rolling resistance coefficient calculating unit 230 calculates the rolling resistance coefficient for obtaining the rolling resistance. FIG. 18 is a diagram illustrating an example of the correlation between the ambient air temperature and the rolling resistance coefficient. As illustrated in FIG. 18, there is a tendency that the rolling resistance coefficient of the tire of the vehicle is larger according as the ambient air temperature is lower and the rolling resistance coefficient of the tire is smaller according as the ambient air temperature is higher. For that reason, for example, the correlation between the ambient air temperature and the rolling resistance coefficient as illustrated in FIG. 18 is stored as a table control map. Accordingly, the rolling resistance coefficient calculating unit 230 can calculate the rolling resistance coefficient from the ambient air temperature by referring to the table control map. Further, as another configuration, the correlation between the ambient air temperature and the rolling resistance coefficient is stored as a function. Then, the rolling resistance coefficient calculating unit 230 may calculate the rolling resistance coefficient from the ambient air temperature. Alternatively, as another configuration, the rolling resistance coefficient calculating unit 230 calculates a correction coefficient of rolling resistance from the ambient air temperature on the basis of the correlation between the ambient air temperature and the correction coefficient of rolling resistance for correcting the rolling resistance coefficient. Then, the rolling resistance coefficient calculating unit 230 corrects the rolling resistance coefficient by the correction coefficient of rolling resistance. Accordingly, the rolling resistance coefficient calculating unit 230 may calculate the rolling resistance coefficient.

There is a case in which the correlation between the ambient air temperature and the rolling resistance coefficient is different in accordance with the type of vehicles or the vehicle equipment (for example, the type of the drive-train or the tire). In this case, the rolling resistance coefficient calculating unit 230 can calculate the rolling resistance coefficient from the ambient air temperature by referring to the correlation between the ambient air temperature and the rolling resistance coefficient in accordance with the type of vehicles or the vehicle equipment. Further, as another configuration, the correction coefficient of rolling resistance is stored in advance in accordance with the type of vehicles or the vehicle equipment. Then, the rolling resistance coefficient calculating unit 230 obtains the correction coefficient of rolling resistance in accordance with the type of vehicles or the vehicle equipment. Accordingly, the rolling resistance coefficient calculating unit 230 may calculate the rolling resistance coefficient on the basis of the correction coefficient of rolling resistance.

Figure 19:
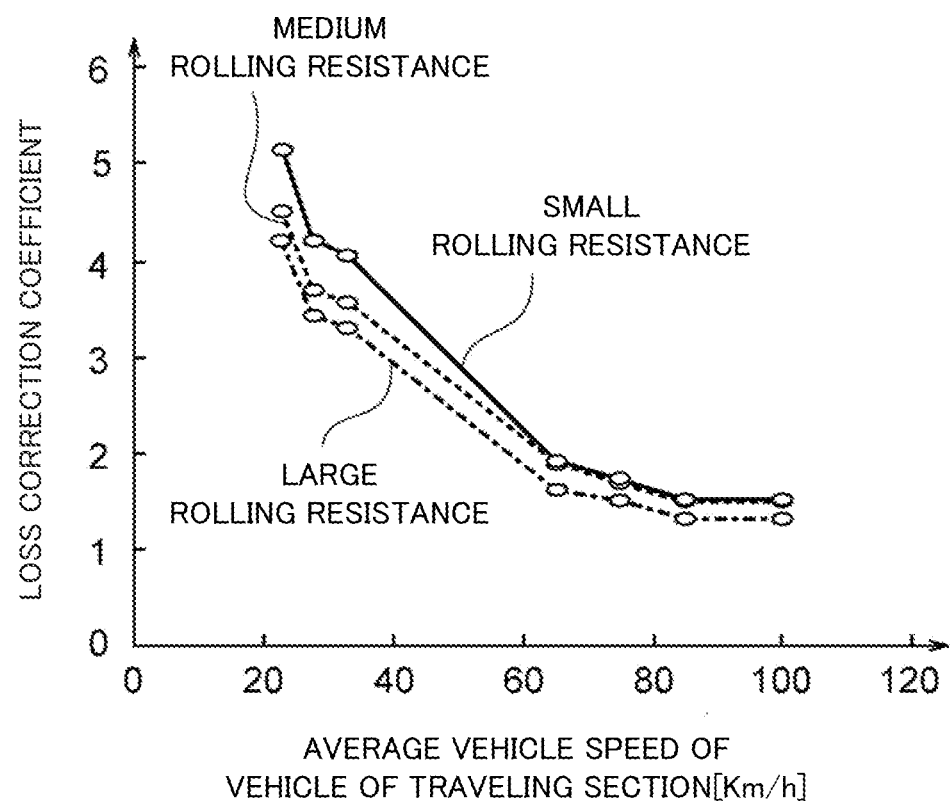
FIG. 19 is a graph illustrating an example of a correlation of a rolling resistance, an average vehicle speed, and a loss correction coefficient.

Further, the correction coefficient calculating unit 150 according to the second embodiment calculates the loss correction coefficient in consideration of the ambient air temperature obtained by the ambient air temperature obtaining unit 210. FIG. 19 is a graph illustrating an example of the correlation of the rolling resistance, the average vehicle speed, and the loss correction coefficient. As described above, the rolling resistance changes in response to the ambient air temperature. For that reason, the correction coefficient calculating unit 150 predicts the rolling resistance in response to the ambient air temperature. Then, the correction coefficient calculating unit 150 calculates the loss correction coefficient on the basis of the predicted rolling resistance and the average vehicle speed $V_{ave}$. Specifically, the correction coefficient calculating unit 150 calculates the loss correction coefficient as a small value as the rolling resistance increases (or the ambient air temperature decreases) at the same average vehicle speed $V_{ave}$.

Figure 20:
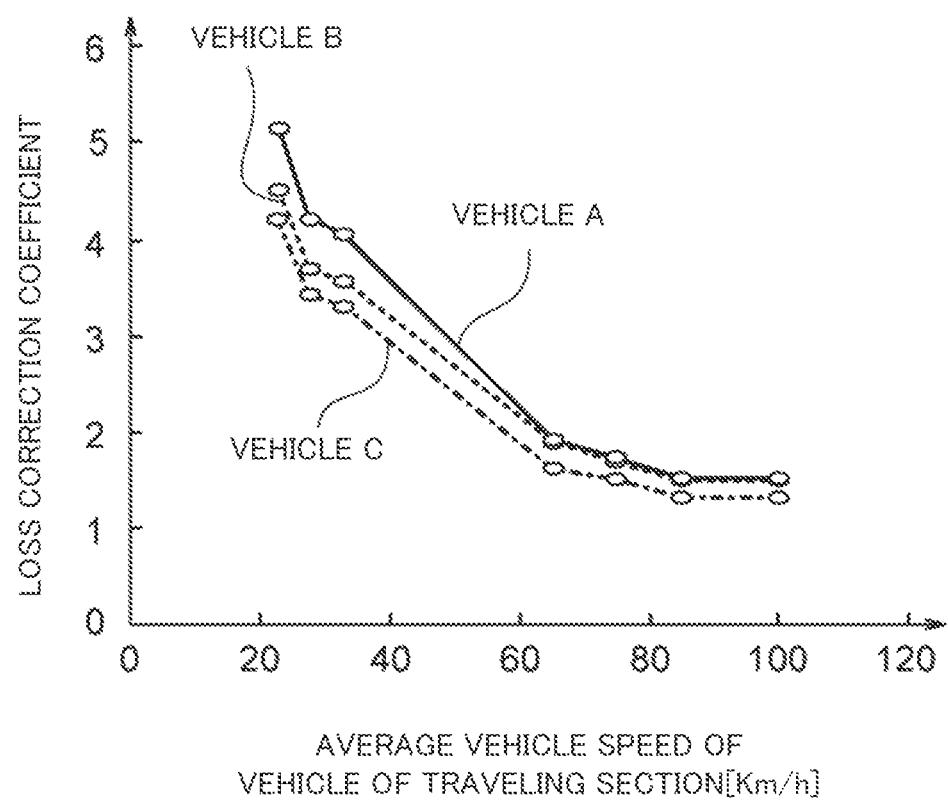
FIG. 20 is a diagram illustrating an example of a loss correction coefficient of each type of vehicles.

Further, the correction coefficient calculating unit 150 calculates the loss correction coefficient in consideration of the vehicle information obtained by the vehicle information obtaining unit 220. FIG. 20 is a diagram illustrating an example of the loss correction coefficient for each type of vehicles. Since the vehicle information such as the vehicle weight except passenger weights, the brake hub drag resistance, the air resistance coefficient, and the entire surface projected area is different in accordance with each type of vehicles, the travel resistance is different in accordance with the type of vehicles. For that reason, as illustrated in FIG. 20, the correction coefficient calculating unit 150 calculates the loss correction coefficient in accordance with the type of vehicles on the basis of the vehicle information obtained by the vehicle information obtaining unit 220 so that the loss correction coefficient is smaller in the type of vehicles having higher travel resistance. For example, in the example illustrated in FIG. 20, the travel resistance is high in order of the vehicle C, the vehicle B, and the vehicle A. In this case, as illustrated in FIG. 20, the loss correction coefficient is calculated as a large value in order of the vehicle A, the vehicle B, and the vehicle C.

Further, the energy consumption predicting unit 130 according to the second embodiment predicts the energy consumption from the current position to the destination by the loss correction coefficient calculated by the correction coefficient calculating unit 150. Further, in the second embodiment, the energy consumption predicting unit 130 calculates the air resistance Fa by using the parameter relating to air resistance which includes the ambient air temperature and the vehicle information. Then, the energy consumption predicting unit 130 predicts the energy consumption from the current position to the destination on the basis of the calculated air resistance.

Figure 21:
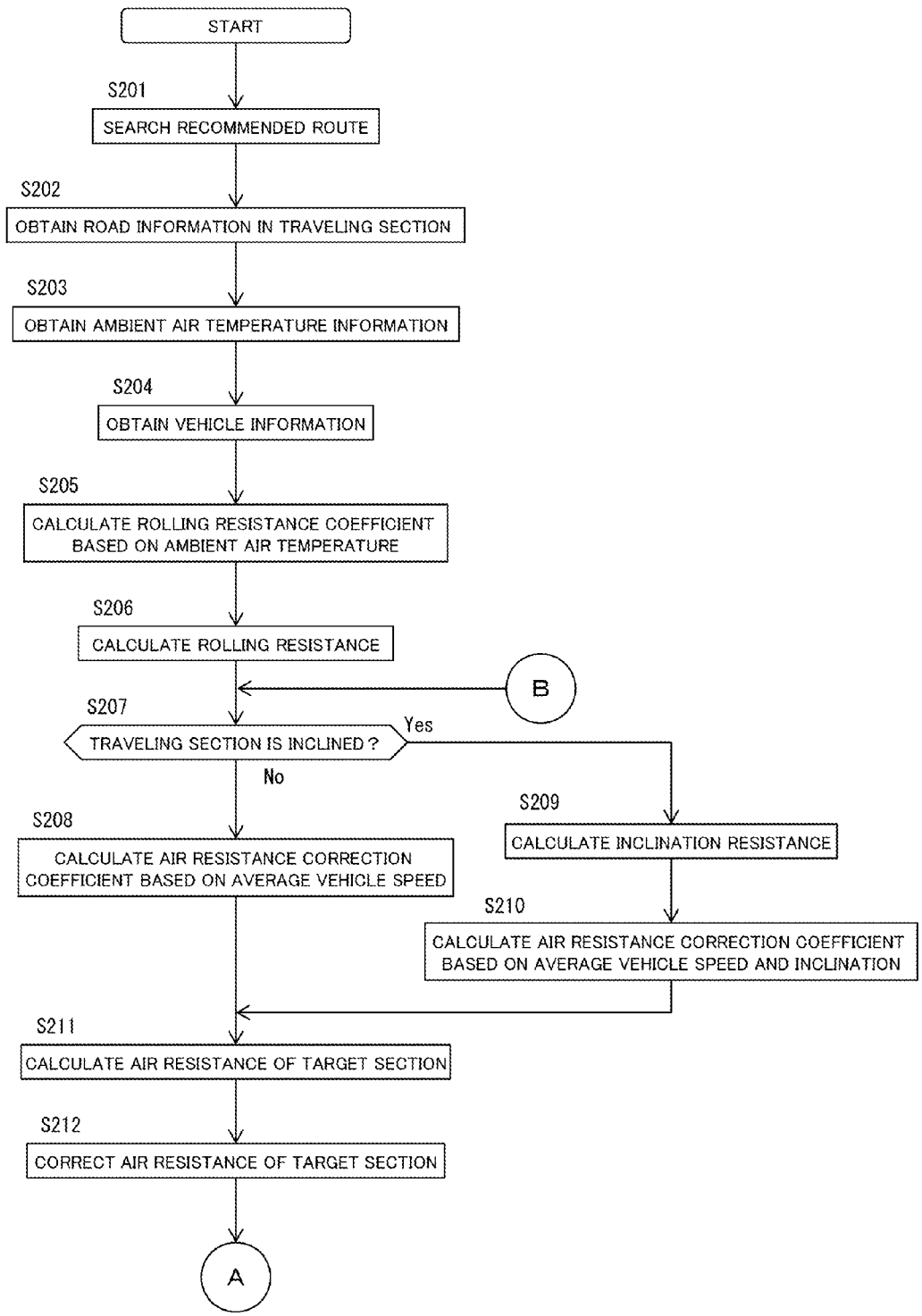
FIG. 21 is a first flowchart illustrating a process for predicting energy consumption according to the second embodiment.
Figure 22:
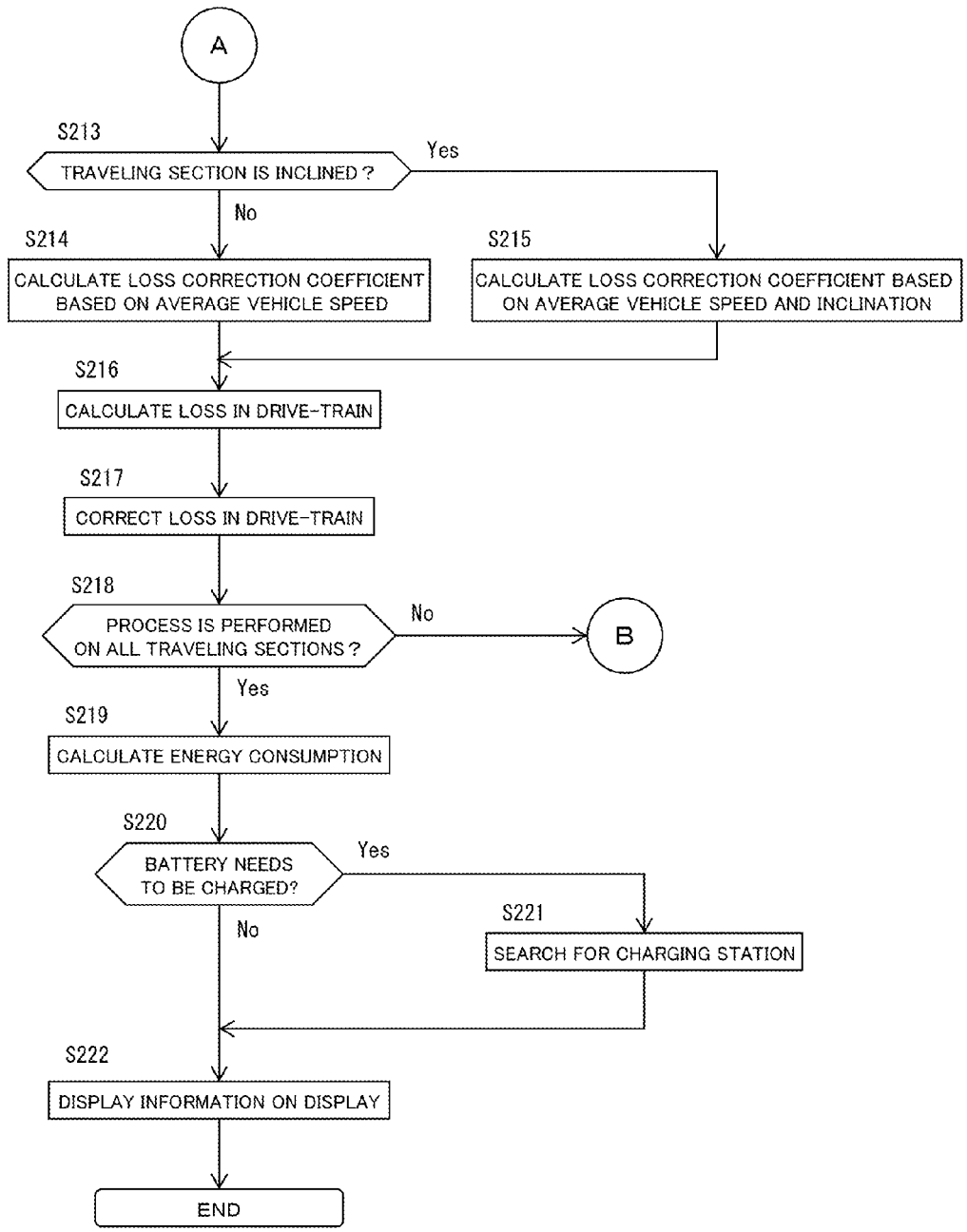
FIG. 22 is a second flowchart illustrating a process for predicting energy consumption according to the second embodiment.

Subsequently, a process or sequence for predicting energy consumption according to the second embodiment will be described with reference to FIGS. 21 and 22. FIGS. 21 and 22 are flowcharts illustrating the process or sequence for predicting the energy consumption according to the second embodiment. For example, the process is also performed in a manner such that the passenger inputs the destination through the input device 200.

In step S201 and step S202, the same processes as those of step S101 and step S102 of the first embodiment are performed. That is, the recommended route from the current position to the destination is searched (step S201). Then, the road information of the searched recommended route is obtained (step S202).

In step S203, the ambient air temperature outside the vehicle is obtained by the ambient air temperature obtaining unit 210 of the control device 100. For example, the ambient air temperature obtaining unit 210 obtains the information of the ambient air temperature from the thermometer mounted in the vehicle. Alternatively, the ambient air temperature obtaining unit 210 predicts the ambient air temperature outside the vehicle on the basis of the combination of at least one or more of the season, the month, the date, the region of the traveling section, and the latitude and the longitude of the traveling section at the current time point. Accordingly, the ambient air temperature obtaining unit 210 can obtain the ambient air temperature outside the vehicle.

In step S204, the vehicle information is obtained by the vehicle information obtaining unit 220 of the control device 100. Specifically, the vehicle information obtaining unit obtains the vehicle information including the vehicle weight, the brake hub drag resistance, the air resistance coefficient, and the entire surface projected area from the memory of the control device 100.

In step S205, the rolling resistance coefficient is calculated by the rolling resistance coefficient calculating unit 230 of the control device 100. For example, the rolling resistance coefficient calculating unit 230 can calculate the rolling resistance coefficient μ on the basis of the ambient air temperature obtained in step S203 by referring to the correlation between the rolling resistance coefficient and the ambient air temperature illustrated in FIG. 18. Then, in subsequent step S206, the integrated value of the rolling resistance Fr of the target section is calculated on the basis of the rolling resistance coefficient μ calculated in step S205 similarly to step S104 of the first embodiment. As illustrated in the formula (4), the rolling resistance Fr is proportional to the rolling resistance coefficient μ, and the value of the rolling resistance Fr is larger according as the value of the rolling resistance coefficient μ is larger. For that reason, as the ambient air temperature is lower, the rolling resistance coefficient μ is larger and the rolling resistance Fr is also higher.

In step S207, it is judged whether the target section is inclined similarly to step S103 of the first embodiment. When the target section is not inclined, the routine proceeds to step S208. In step S208, the air resistance correction coefficient α of the target section is calculated on the basis of the average vehicle speed $V_{ave}$ of the target section and the correction coefficient calculating function $f_1$ of the traveling section being not inclined similarly to step S105 of the first embodiment. On the other hand, when the target section is inclined, the routine proceeds to step S209. In step S209, the inclination resistance Fi of the target section is calculated similarly to step S106 of the first embodiment. In subsequent step S210, the air resistance correction coefficient α of the target section is calculated on the basis of the correction coefficient calculating function $f_2$ of the traveling section being inclined, the average vehicle speed $V_{ave}$ of the target section, and the inclination θ of the process target section similarly to step S108 of the first embodiment.

In step S211, the integrated value of the air resistance Fa of the target section is calculated by the energy consumption predicting unit 130. Specifically, in the second embodiment, the energy consumption predicting unit 130 calculates the integrated value of the air resistance Fa on the basis of the formula (16) as below.

[Formula 15]

$$\text{INTEGRATED VALUE OF AIR RESISTANCE } Fa = k'V^2 * d \quad (16)$$

In the formula (16), k' indicates a parameter relating to the air resistance. The parameter k' is set in response to the ambient air temperature obtained in step S203 or the vehicle information such as the vehicle weight, the brake hub drag resistance, the air resistance coefficient, and the entire surface projected area obtained in step S204. Further, in the formula (16), V indicates the average vehicle speed in the target section obtained in step S202. In the formula (16), d indicates a traveling distance of the target section.

In step S212, the integrated value of the air resistance Fa of the target section is corrected on the basis of the air resistance correction coefficient α calculated in step S208 or step S210 and the integrated value of the air resistance Fa calculated in step S211 similarly to step S110 of the first embodiment.

Then, as illustrated in FIG. 22, in step S213, it is judged whether the target section is inclined similarly to step S207. When the target section is not inclined, the routine proceeds to step S214. On the other hand, when the target section is inclined, the routine proceeds to step S215.

In step S214, the loss correction coefficient of the target section is calculated by the correction coefficient calculating unit 150. In the second embodiment, the correction coefficient calculating unit 150 calculates the loss correction coefficient of the target section in consideration of the ambient air temperature obtained in step S203 and the vehicle information obtained in step S204. Specifically, the correction coefficient calculating unit 150 stores the function $f_5$ of the traveling section being not inclined in the correction coefficient storing unit 140. As illustrated in FIGS. 19 and 20, the function $f_5$ indicates the correlation between the average speed $V_{ave}$ of the vehicle and the loss correction coefficient β, and corresponds to the rolling resistance and the type of vehicles. As below, the correction coefficient calculating unit 150 calculates the loss correction coefficient β of the traveling section being not inclined. The loss correction coefficient β is corresponding to the rolling resistance, the type of vehicles, and the average vehicle speed $V_{ave}$ at the current time point. The correction coefficient calculating unit 150 calculates the loss correction coefficient β on the basis of the vehicle information k", the ambient air temperature t, and the average vehicle speed $V_{ave}$ of the target section as illustrated in the formula (17).

[Formula 16]

$$\text{LOSS CORRECTION COEFFICIENT } \beta = f_5(V_{ave}, t, k'') \quad (17)$$

Further, the method for calculating the loss correction coefficient β is not limited to the formula (17). For example, the loss correction coefficient β may be calculated by the rolling resistance calculated in step S205.

In step S213, when it is judged that the target section is inclined, the routine proceeds to step S215. Even in this case, the correction coefficient calculating unit 150 calculates the loss correction coefficient of the target section in consideration of the ambient air temperature obtained in step S203 and the vehicle information obtained in step S204. Specifically, the correction coefficient calculating unit 150 stores the function $f_6$ of the traveling section being inclined in the correction coefficient storing unit 140. As illustrated in FIGS. 19 and 20, the function $f_6$ indicates the correlation between the average vehicle speed $V_{ave}$ and the loss correction coefficient β, and corresponds to the rolling resistance and the type of vehicles. As below, the correction coefficient calculating unit 150 calculates the loss correction coefficient β of the traveling section being inclined. The loss correction coefficient β is corresponding to the current rolling resistance, the type of vehicles, the inclination θ, and the average speed $V_{ave}$ of the vehicle. The correction coefficient calculating unit 150 calculates the loss correction coefficient β on the basis of the vehicle information k", the ambient air temperature t, the inclination θ, and the average vehicle speed $V_{ave}$ of the target section as illustrated in the formula (18).

[Formula 17]

$$\text{LOSS CORRECTION COEFFICIENT } \beta = f_6(V_{ave}, \theta, t, k'') \quad (18)$$

In step S216 to step S222, processes is performed as same as those of step S114 to step S120 of the first embodiment. That is, the integrated value of loss in the drive-train of the target section is calculated on the basis of the rolling resistance calculated in step S206 and the air resistance corrected in step S212 (step S216). The loss L in the drive-train of the target section is corrected on the basis of the loss correction coefficient β calculated in step S214 or step S215 and the integrated value of the loss L in the drive-train calculated in step S216 (step S217).

Then, when the processes in step S203 to step S217 are performed in all traveling sections in the recommended route ('Yes' in step S218), the energy consumption from the current position to the destination is predicted (step S219). It is determined whether the battery needs to be charged by the time the vehicle reaches the destination on the basis of the predicted energy consumption to the destination (step S220). When it is determined that the battery needs to be charged, the charging station around the vehicle is searched (step S221). Subsequently, information including the energy consumption to the destination is displayed on the display 500 for the passenger (step S222).

As described above, the navigation device 1 of the second embodiment obtains the ambient air temperature and the vehicle information. The navigation device 1 calculates the rolling resistance coefficient and the loss correction coefficient in consideration of the ambient air temperature and the vehicle information. Then, the navigation device 1 predicts the energy consumption from the current position to the destination by using the rolling resistance coefficient and the loss correction coefficient. Accordingly, the navigation device 1 of the second embodiment can predict the energy consumption in consideration of the ambient air temperature and the type of vehicles (or the vehicle equipment) in addition to the effect of the first embodiment. As a result, it is possible to highly precisely predict the energy consumption.

Figure 23:
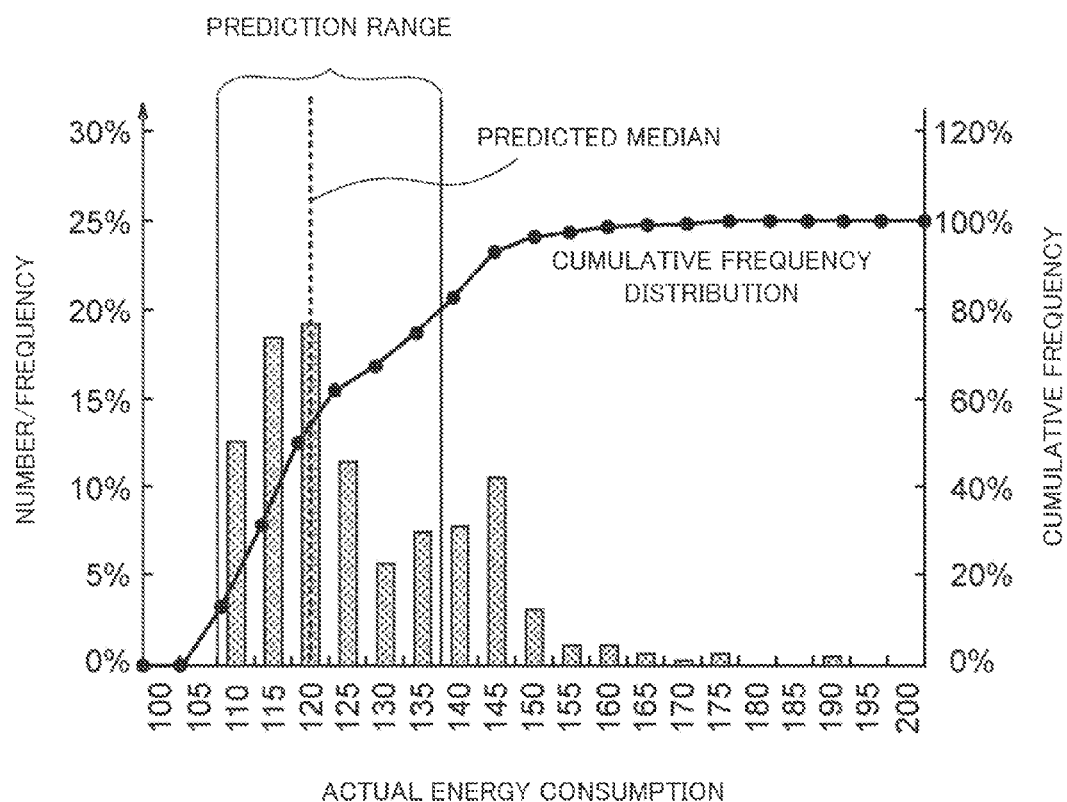
FIG. 23 is a diagram illustrating an example of actual energy consumption and energy consumption predicted regardless of an ambient air temperature.

FIG. 23 is a diagram illustrating an example of the actual energy consumption and the predicted energy consumption without considering the ambient air temperature. In FIG. 23, the horizontal axis indicates the actual energy consumption. The vertical axis indicates the number (frequency) of vehicles each actual energy consumption. FIG. 23 illustrates the median of the predicted energy consumption of the vehicles and the prediction range of ±10% from the median. As illustrated in FIG. 23, when the energy consumption is predicted without considering the ambient air temperature, the vehicle of which the actual energy consumption fell within the prediction range of the energy consumption is about 67% in total.

Figure 24:
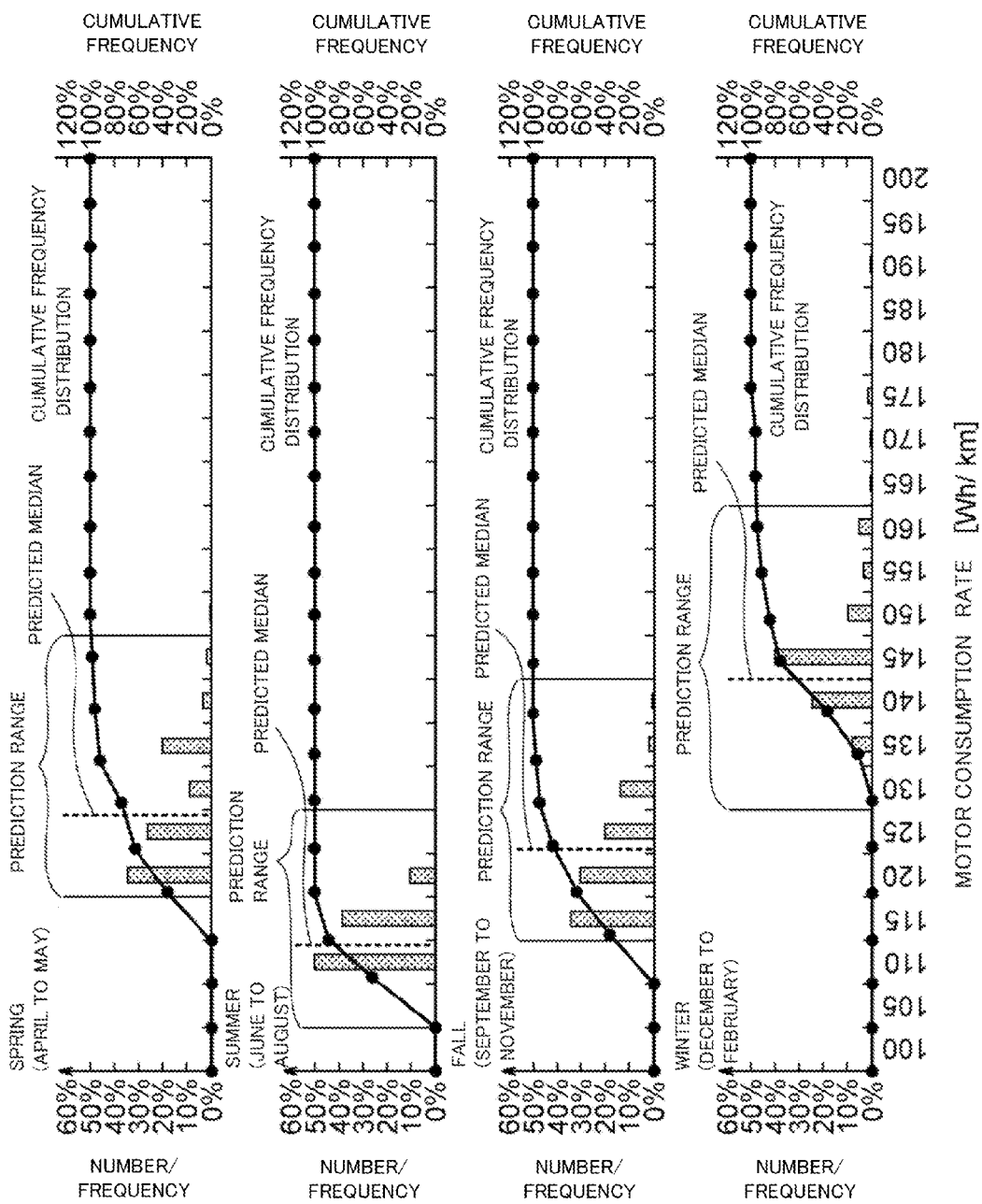
FIG. 24 is a diagram illustrating an example of actual energy consumption and energy consumption predicted in consideration of an ambient air temperature.

On the contrary, FIG. 24 is a diagram illustrating an example of the predicted energy consumption in consideration of the actual energy consumption and the ambient air temperature. Further, in FIG. 24, the horizontal axis indicates the actual energy consumption similarly to FIG. 23. The vertical axis indicates the number (frequency) of vehicles each actual energy consumption. FIG. 24 also illustrates the median of predicted energy consumption and the prediction range of ±10% from the median. As illustrated in FIG. 24, when the energy consumption is predicted in consideration of the ambient air temperature, the vehicle of which the actual energy consumption fell within the prediction range is 90% or more in four seasons. In this way, when the energy consumption is predicted in consideration of the ambient air temperature, it is possible to highly precisely predict the energy consumption compared to a case in which the energy consumption is predicted without considering the ambient air temperature as illustrated in FIG. 23.

Figure 25:
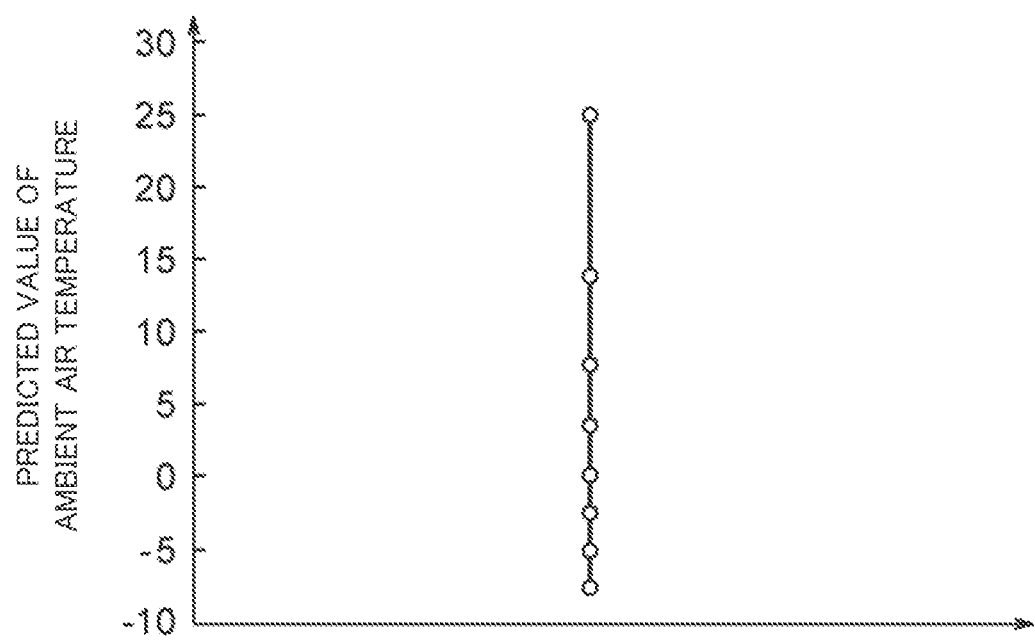
FIG. 25 is a diagram illustrating an example of a predicted value of ambient air temperature.

Further, in the second embodiment, when the ambient air temperature is predicted on the basis of the combination of the season, the month, the date, the region of the traveling section, and the latitude and the longitude of the traveling section, the ambient air temperature is predicted at the smaller temperature interval as the ambient air temperature is lower. FIG. 25 is a diagram illustrating an example of the predicted value of ambient air temperature which is necessary for most of the actual energy consumption falling within the prediction range as illustrated in FIG. 24. The rolling resistance is higher according as the ambient air temperature is lower. For that reason, in order to set the actual energy consumption within the prediction range, it is necessary to be higher precision of the prediction of ambient air temperature (to be smaller prediction temperature interval) according as the ambient air temperature is lower as illustrated in FIG. 25. In the embodiment, as illustrated in FIG. 25, the precision of the predicting of ambient air temperature is higher according as the ambient air temperature is lower. Accordingly, it is possible to highly precisely calculate the rolling resistance on the basis of the ambient air temperature.

Further, in the second embodiment, as illustrated in FIG. 19, the loss correction coefficient corresponding to the rolling resistance is calculated on the basis of the ambient air temperature. There is a tendency that the work efficiency of the motor caused by the acceleration and deceleration is small when the rolling resistance is high. For that reason, since the loss correction coefficient is smaller according as the rolling resistance is higher, it is possible to highly precisely predict the loss in the drive-train in the target section. As a result, it is possible to highly precisely predict the energy consumption.

Figure 26:
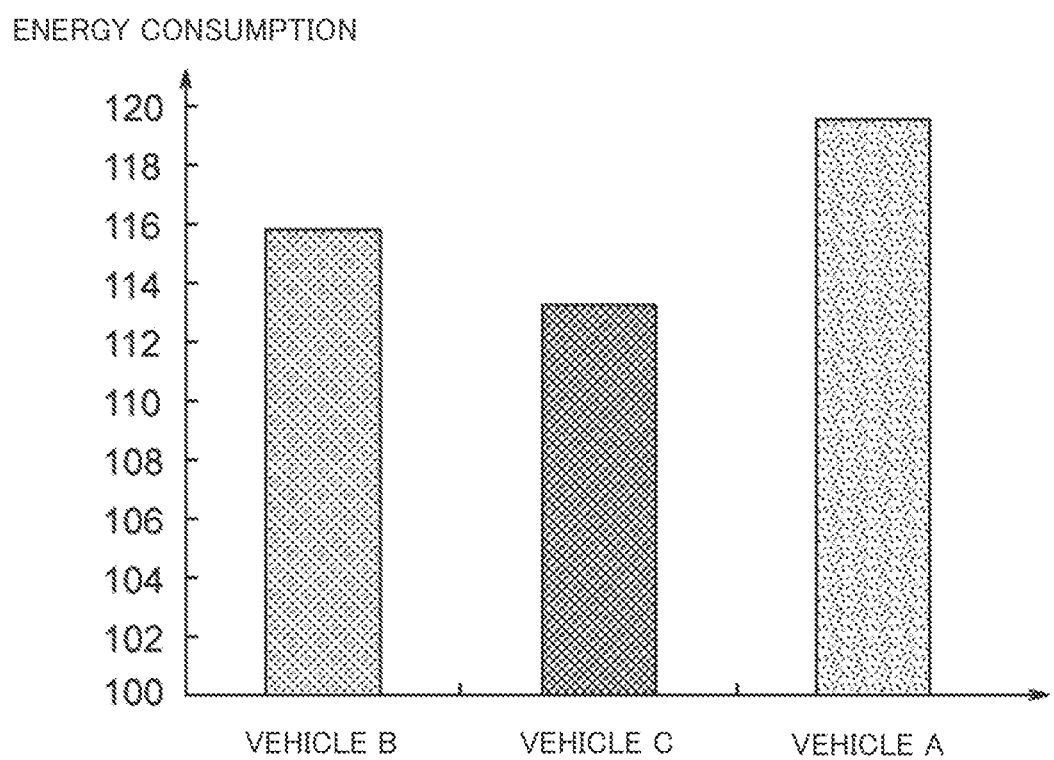
FIG. 26 is a graph illustrating an example of energy consumption of each type of vehicles.

Further, in the embodiment, as illustrated in FIG. 20, the loss correction coefficient corresponding to the type of vehicles is calculated on the basis of the vehicle information. FIG. 26 is a diagram illustrating a difference in the energy consumption in accordance with the type of vehicles. For example, there is a case in which the vehicle weight (the vehicle weight except passenger weights), the brake hub drag resistance, the air resistance coefficient, and the projected area are different in accordance with the type of vehicles. And there is a case in which the travel resistance is different in accordance with the type of vehicles. For that reason, when the energy consumption is predicted without considering the vehicle information, there is a case in which an error of about ±3% occurs in accordance with the type of vehicles as illustrated in FIG. 26. In the embodiment, since the loss correction coefficient corresponding to the type of vehicles is calculated in consideration of the vehicle information, it is possible to decrease such error. As a result, it is possible to highly precisely predict the energy consumption.

The above-described embodiments are employed for the easy comprehension of the invention, and do not limit the invention. Thus, the components disclosed in the above-described embodiments include all modifications in design or equivalents that belong to the technical scope of the invention.

For example, in the above-described embodiments, the navigation device 1 mounted on the electric vehicle has been described as an example for the present invention. However, the present invention is not limited to this configuration. For example, the device for predicting the energy consumption may be configured to be mounted on a hybrid vehicle, an engine vehicle, or a system other than a vehicle. For example, when the present invention is applied to the engine vehicle, it is possible to appropriately predict the petroleum fuel consumption to the destination on the basis of the integrated value of air resistance to the destination and the integrated value of loss in the drive-train such as the motor or the gear.

Further, in the above-described embodiments, a configuration of calculating the integrated value of air resistance or the integrated value of loss in the drive-train by using the average vehicle speed $V_{ave}$ in the traveling section has been exemplified. However, a configuration of using a limit speed of the traveling section instead of the average vehicle speed $V_{ave}$ in the traveling section may be employed. Further, a configuration of using the average vehicle speed in the same kind of the traveling section (for example, a street or a suburb) instead of the average vehicle speed $V_{ave}$ of the traveling section may be employed.

Further, the map information obtaining unit 110 of the above-described embodiments corresponds to the obtain unit of the present invention. The correction coefficient calculating unit 150 and the energy consumption predicting unit 130 of the above-described embodiments respectively correspond to the air resistance calculating unit and the loss calculating unit of the present invention. The energy consumption predicting unit 130 of the above-described embodiments corresponds to the energy consumption predicting unit of the present invention. The rolling resistance coefficient calculating unit 230 of the above-described embodiments corresponds to the rolling resistance calculating unit of the present invention.

DESCRIPTION OF REFERENCE NUMERALS

1 . . . Navigation device
100 . . . Control device
110 . . . Map information obtaining unit
120 . . . Recommended route searching unit
130 . . . Energy consumption predicting unit
140 . . . Correction coefficient storing unit
150 . . . Correction coefficient calculating unit
160 . . . Charging necessity determining unit
170 . . . Charging station searching unit
180 . . . Display unit
210 . . . Ambient air temperature obtaining unit
220 . . . Vehicle information obtaining unit
230 . . . Rolling resistance coefficient calculating unit
200 . . . Input device
300 . . . Own vehicle position detecting device
400 . . . Map database
500 . . . Display

The invention claimed is:

1. A device for predicting energy consumption comprising:
an obtaining unit configured to obtain road information including traveling speed information set for each route;
an air resistance calculating unit configured to
calculate air resistance as a calculated air resistance value by using an air calculation formula on a basis of the traveling speed information of a scheduled traveling route, air resistance being caused when a vehicle travels along the scheduled traveling route, and
correct the calculated air resistance value so that the calculated air resistance increases as a traveling speed along the scheduled traveling route decreases; and
an energy consumption predicting unit configured to predict energy consumption over the scheduled traveling route on a basis of the corrected calculated air resistance value.

2. The device for predicting energy consumption according to claim 1, wherein
the road information includes inclination information for each route, and
the air resistance calculating unit corrects the calculated air resistance value so that the air resistance decreases as an inclination in the scheduled traveling route becomes steeper.

3. The device for predicting energy consumption according to claim 1, further comprising:
a loss calculating unit configured to
calculate loss in a drive-train as a calculated loss value by using a loss calculation formula on the basis of the traveling speed information, the loss in a drive-train being caused when the vehicle travels along the scheduled traveling route, and
correct the calculated loss value so that the loss in the drive-train increases as the traveling speed decreases, wherein
the energy consumption predicting unit predicts the energy consumption on a basis of the calculated air resistance value and the calculated loss value.

4. The device for predicting energy consumption according to claim 3, wherein
the road information includes inclination information for each route, and
the loss calculating unit corrects the calculated loss value so that the loss in the drive-train increases as an inclination of the scheduled traveling route becomes steeper.

5. The device for predicting energy consumption according to claim 1, further comprising:
a rolling resistance calculating unit configured to calculate rolling resistance as a calculated rolling resistance value by using a rolling resistance calculation formula, the rolling resistance being caused when the vehicle travels along the scheduled traveling route, wherein
the rolling resistance calculating unit calculates the calculated rolling resistance value on a basis of ambient air temperature, and
the energy consumption predicting unit predicts the energy consumption on a basis of the calculated air resistance value and the calculated rolling resistance value.

6. The device for predicting energy consumption according to claim 5, wherein
the rolling resistance calculating unit calculates the calculated rolling resistance value so that the calculated rolling resistance value increases as the ambient air temperature decreases.

7. The device for predicting energy consumption according to claim 5, wherein
the rolling resistance calculating unit obtains the ambient air temperature by obtaining information of the ambient air temperature from an external device or predicting the ambient air temperature on a basis of at least one or more conditions, and
the conditions are a season, a month, a date, a region of the scheduled traveling route, and a latitude and a longitude of the scheduled traveling route.

8. The device for predicting energy consumption according to claim 7, wherein
the rolling resistance calculating unit, at the time of predicting the ambient air temperature on the basis of at least one or more of the season, the month, the date, the region of the scheduled traveling route, and the latitude and the longitude of the scheduled traveling route, predicts at smaller temperature intervals between predicted values of the ambient air temperature as the ambient air temperature decreases.

9. The device for predicting energy consumption according to claim 3, wherein
the loss calculating unit corrects the calculated loss value so that the loss in the drive-train decreases as the rolling resistance increases.

10. The device for predicting energy consumption according to claim 3, wherein
the loss calculating unit corrects the calculated loss value by using a coefficient corresponding to a type of vehicle.

11. A method for predicting energy consumption comprising:
calculating air resistance as a calculated air resistance value, via a device for predicting energy consumption, by using an air resistance calculation formula on a basis of traveling speed information of a scheduled traveling route, the air resistance being caused when a vehicle travels along the scheduled traveling route;

correcting the calculated air resistance value, via the device, so that the air resistance increases as a traveling speed of the scheduled traveling route decreases; and predicting energy consumption over the scheduled traveling route, via the device, on a basis of the corrected calculated air resistance value.

\* \* \* \* \*